US012699069B1

(12) United States Patent
France

(10) Patent No.: US 12,699,069 B1
(45) Date of Patent: Aug. 4, 2026

(54) OLFACTORY SENSING DEVICE AND A METHOD OF DETECTING AN ODORANT USING AN OLFACTORY SENSING DEVICE

(71) Applicant: Kordel Kade France, Allen, TX (US)

(72) Inventor: Kordel Kade France, Allen, TX (US)

( * ) Notice: Subject to any disclaimer, the term of this patent is extended or adjusted under 35 U.S.C. 154(b) by 0 days.

(21) Appl. No.: 19/196,701

(22) Filed: May 1, 2025

(51) Int. Cl.
  *G01N 27/416* (2006.01)
  *G01N 1/24* (2006.01)
  *G01N 27/30* (2006.01)

(52) U.S. Cl.
  CPC ........... *G01N 27/4162* (2013.01); *G01N 1/24* (2013.01); *G01N 27/30* (2013.01); *G01N 2001/245* (2013.01)

(58) Field of Classification Search
  CPC ...... G01N 33/00; G01N 33/48; G01N 33/483; G01N 33/497; G01N 33/0004; G01N 33/0009; G01N 33/0027; G01N 33/0031; G01N 27/4141; G01N 27/4162; G01N 27/00; G01N 27/327; G01N 2001/245
  See application file for complete search history.

(56) References Cited

U.S. PATENT DOCUMENTS

| 8,726,719 | B2 | 5/2014 | Vass et al. |
| 11,479,142 | B1 | 10/2022 | Govan |
| 12,235,639 | B1 | 2/2025 | Downey |
| 2016/0051815 | A1 | 2/2016 | Costanzo |
| 2016/0378109 | A1 | 12/2016 | Raffa |
| 2018/0250430 | A1 | 9/2018 | Machovina et al. |

| 2020/0260228 | A1 | 8/2020 | Arunachalam | |
| 2020/0326286 | A1* | 10/2020 | Hallack ................ | G01N 33/004 |
| 2020/0371530 | A1 | 11/2020 | Anderson et al. | |

(Continued)

FOREIGN PATENT DOCUMENTS

| CN | 110558949 A | 12/2019 |
| CN | 119124198 A | 12/2024 |

(Continued)

OTHER PUBLICATIONS

Univeristy of Maryland, 'Smellicopter' drone uses live moth antenna to seek smells, avoid obstacles, <https://ece.umd.edu/news/story/lsquosmellicopterrsquo-drone-uses-live-moth-antenna-to-seek-smells-avoid-obstacles>, published Dec. 8, 2020; printed Aug. 8, 2025.

(Continued)

*Primary Examiner* — Gurpreet Kaur
(74) *Attorney, Agent, or Firm* — Mousilli Legal Group, PLLC; Feras Mousilli; Benjamin M. Hanrahan

(57) ABSTRACT

An olfactory sensing device is presented herein. The device includes a housing with at least one inlet or outlet port to facilitate a flow of air through an interior area. At least one olfactory processing unit (OPU) is disposed within the interior area and includes at least one base, several chemical detection sensors, a potentiostat configured to sense an electrochemical response of an odorant in the flow of air, and a processor. Each of the chemical detection sensors are tuned to detect a particular chemical compound. The OPU is formed in such a way to facilitate an effective flow of air through the interior area such that the sensors are effectively exposed to the chemicals in the air. A main controller is communicative with each of the OPUs and includes its own processor to fuse sensor data from the sensors to generate a chemical profile in the air.

16 Claims, 31 Drawing Sheets

(56) References Cited

U.S. PATENT DOCUMENTS

| | | | |
|---|---|---|---|
| 2021/0267098 | A1 | 8/2021 | Wippler |
| 2021/0386317 | A1 | 12/2021 | Prasad et al. |
| 2022/0269996 | A1 | 8/2022 | Nogami |
| 2023/0350199 | A1 | 11/2023 | Auerbach |
| 2023/0393110 | A1 | 12/2023 | Amin et al. |
| 2024/0000368 | A1 | 1/2024 | Maggioni et al. |
| 2024/0015265 | A1 | 1/2024 | Ballantyne |
| 2024/0027394 | A1 | 1/2024 | Kratz et al. |
| 2024/0081674 | A1 | 3/2024 | Prasad et al. |
| 2025/0157080 | A1 | 5/2025 | Rizzo |
| 2026/0065671 | A1 | 3/2026 | Yang |

FOREIGN PATENT DOCUMENTS

| | | |
|---|---|---|
| GB | 2401752 A | 11/2004 |
| KR | 102207175 B1 | 1/2021 |
| KR | 20220135470 A | 10/2022 |
| KR | 20240113891 A | 7/2024 |
| KR | 20240139481 A | 9/2024 |
| WO | 2014092527 A1 | 6/2014 |

OTHER PUBLICATIONS

Han, Joon Kyu, et al., "Artificial Olfactory Neuron for an In-Sensor Neuromorphic Nose," Advanced Science, vol. 9, No. 18, article 2106017, Apr. 15, 2022, doi: 10.1002/advs.202106017, URL <https://advanced.onlinelibrary.wiley.com/doi/10.1002/advs.202106017>.

Kim, Chuntae, et al., "Artificial olfactory sensor technology that mimics the olfactory mechanism: a comprehensive review," Biomaterials Research, vol. 26, article 40, 2022, doi: 10.1186/s40824-022-00287-1, URL <https://spj.science.org/doi/10.1186/s40824-022-00287-1>.

Anderson, M. J., et al., "A bio-hybrid odor-guided autonomous palm-sized air vehicle," Bioinspiration & Biomimetics, vol. 16, No. 2, article 026002, Dec. 16, 2020, DOI: 10.1088/1748-3190/abbd81, URL: < https://iopscience.iop.org/article/10.1088/1748-3190/abbd81>.

Hassan, S., et al., "Robotic Odor Source Localization via Vision and Olfaction Fusion Navigation Algorithm," Sensors, vol. 24, No. 7, article 2309, Apr. 5, 2024, DOI: 10.3390/s24072309, URL <https://www.mdpi.com/1424-8220/24/7/2309>.

* cited by examiner

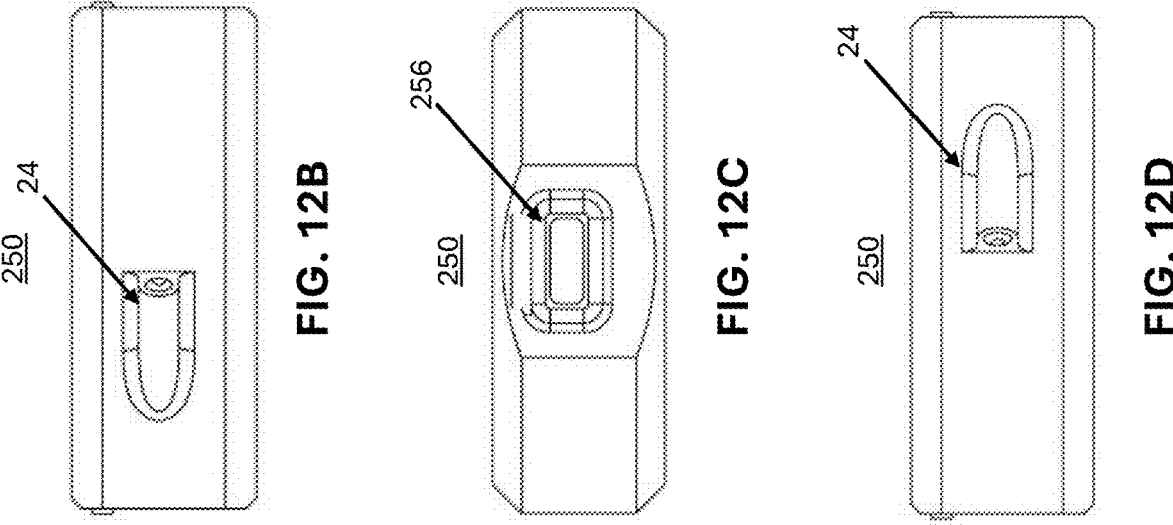
FIG. 12B
FIG. 12C
FIG. 12D
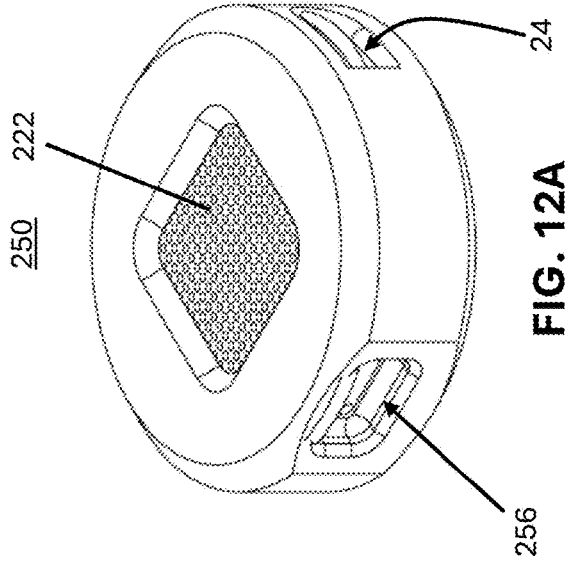
FIG. 12A

250    222

250

75

70

Ammonia

History

Session 6SK78CN6
Date: 2025-05-01 @ 1:00:26

Session AM7HX09T
Date: 2025-05-01 @ 1:01:16

Session TUCHDLNA
Date: 2025-05-01 @ 2:02:28

OLFACTORY SENSING DEVICE AND A METHOD OF DETECTING AN ODORANT USING AN OLFACTORY SENSING DEVICE

FIELD OF THE INVENTION

The present invention is generally directed to olfaction sensing devices, and more specifically to a neuromorphic or pseudo-neuromorphic olfaction computer, system and method.

BACKGROUND OF THE INVENTION

Identifying chemical compounds in the air can provide helpful information relating to, for example, the environmental air quality within a confined or indoor space or outdoors, whether the environment or air quality is hazardous to humans or animals, whether there are rotting food items or decomposing human or animal remains nearby, etc.

The precision of identifying the chemical compound(s) in the air is important in that false readings, whether false positive readings or false negative readings, can and likely will lead to incorrect assessments of the air quality or safety, for example.

The Gas Chromatography-Mass Spectrometry (GCMS) device or machine is a powerful and rather precise and accurate device that uses analytical techniques that combines gas chromatography and mass spectrometry to identify and quantify chemical compounds in a sample. Due to its precision and reliance, the GCMS machine is often used in several fields such as forensics, environmental monitoring and drug testing. However, the GCMS machine is large, heavy and immobile, and can take several hours to run a sample. Additionally, using the GCMS machine, it is difficult to monitor temporal changes within the air that occur in the course of seconds or minutes which can impact the sample readings.

For these, and several other reasons, there is a need in the art for a more compact and in some cases mobile olfactory sensing device that can accurately and reliably detect chemicals or chemical compounds in the air. The proposed device can use several olfactory sensors mounted on or within a housing and arranged in a neuromorphic or pseudo-neuromorphic manner to provide nearly instantaneous results that can be used for scent-based navigation, detection, and other uses.

SUMMARY OF THE INVENTION

Accordingly, at least one embodiment of the present invention is generally directed to a neuromorphic or pseudo-neuromorphic computer that includes several chemical detection sensors that are used to profile several compounds in the surrounding air. The sensors, which may include but are in no way limited to electrochemical sensors, metal oxide sensors, optical sensors, acoustic sensors, etc., can operate in parallel to provide fast and accurate results.

Some embodiments further include environmental sensors, such as temperature sensors, pressure sensors and/or humidity sensors to detect environmental conditions and apply those environmental conditions to the sensor readings. This is because even a small shift in environmental conditions can have a big impact on the olfactory sensor readings, and some embodiments of the present invention can adjust the olfactory sensor readings based thereupon using various algorithms, artificial intelligence models, etc.

In some embodiments, the device of the present invention may also include or communicate with one or more microphones or audio sensors to detect sounds and to listen to and analyze subtle sound frequencies that may be contributing to certain compound emissions. This information can then be used to locate (e.g., using triangulation or other like techniques) the source of the sound and/or detected chemicals. One or more cameras, lidar, location-based devices, navigation-based devices, GPS devices, or other like sensors can also be used to contribute to the detection of the location or source of the chemical(s), compound(s), scent(s) or odor(s), for example.

More in particular, in some embodiments, each of the olfactory sensors are tuned to detect a specific chemical, chemical compound or group of chemical compounds (e.g., hydrocarbons). As chemicals interface with the sensor's receptor(s), the device of the present invention acquires and logs the data. Data from all of the sensors are fused together to approximate chemical constituents to a degree similar to the GCMS machine. This data can then be input into denoising filters and statistical learning algorithms to further analyze the data and ensure precise readings and outputs. This process can last between 0.5 seconds to 60 seconds and can repeat recursively while the olfactory device of at least one embodiment is on and active.

BRIEF DESCRIPTION OF DRAWINGS

FIG. 5C is a top view thereof.

FIG. 5D is a bottom view thereof.

FIG. 12A is a top perspective view of yet another embodiment of the olfactory sensoring device as disclosed herein.

FIG. 12B is a left-side view thereof.

FIG. 12C is a front view thereof.

FIG. 12D is a right-side view thereof.

Like reference numerals refer to like parts throughout the several views of the drawings provided herein.

DETAILED DESCRIPTION OF THE INVENTION

Figure 1B:
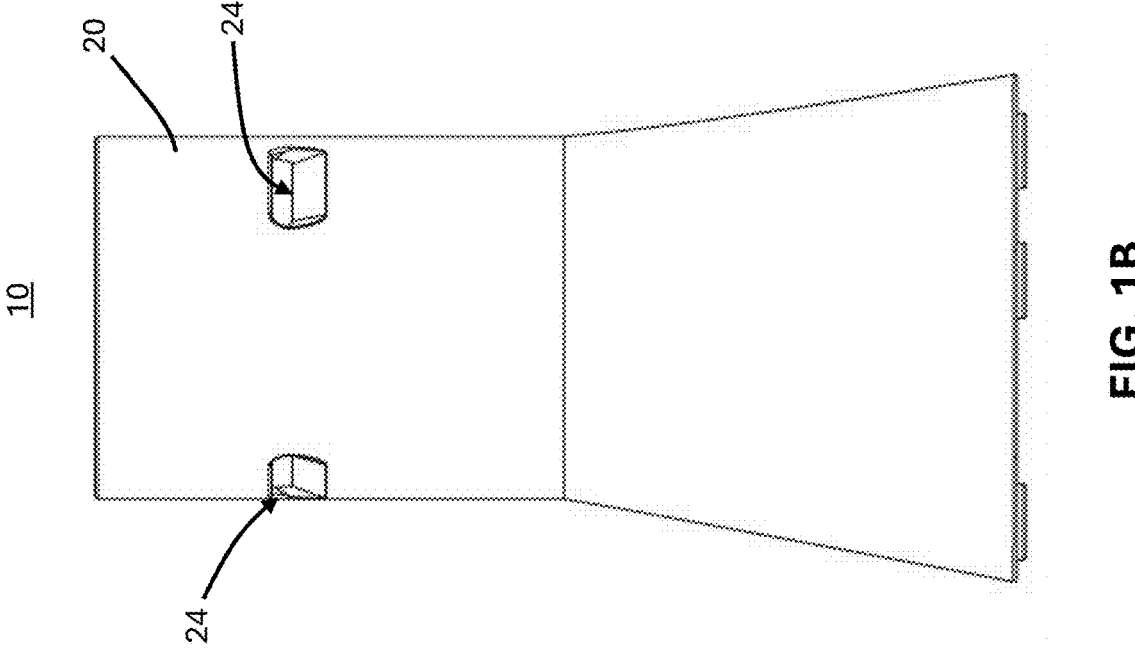
FIG. 1B is a left-side view thereof.
Figure 1A:
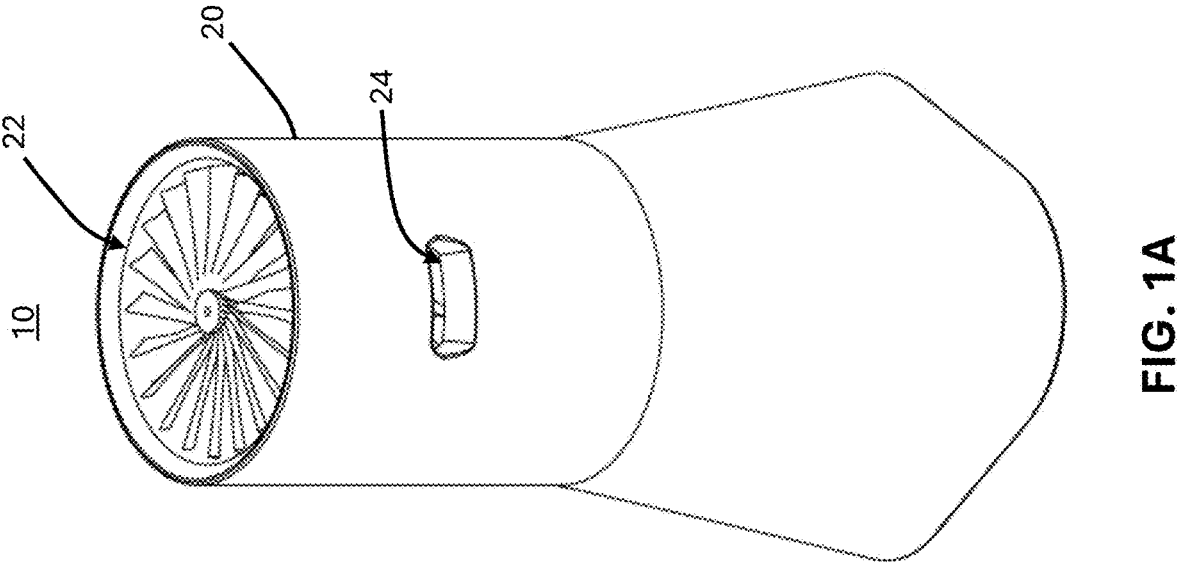
FIG. 1A is a perspective view of the olfactory sensory device as disclosed in accordance with at least one embodiment of the present invention.
Figure 1D:
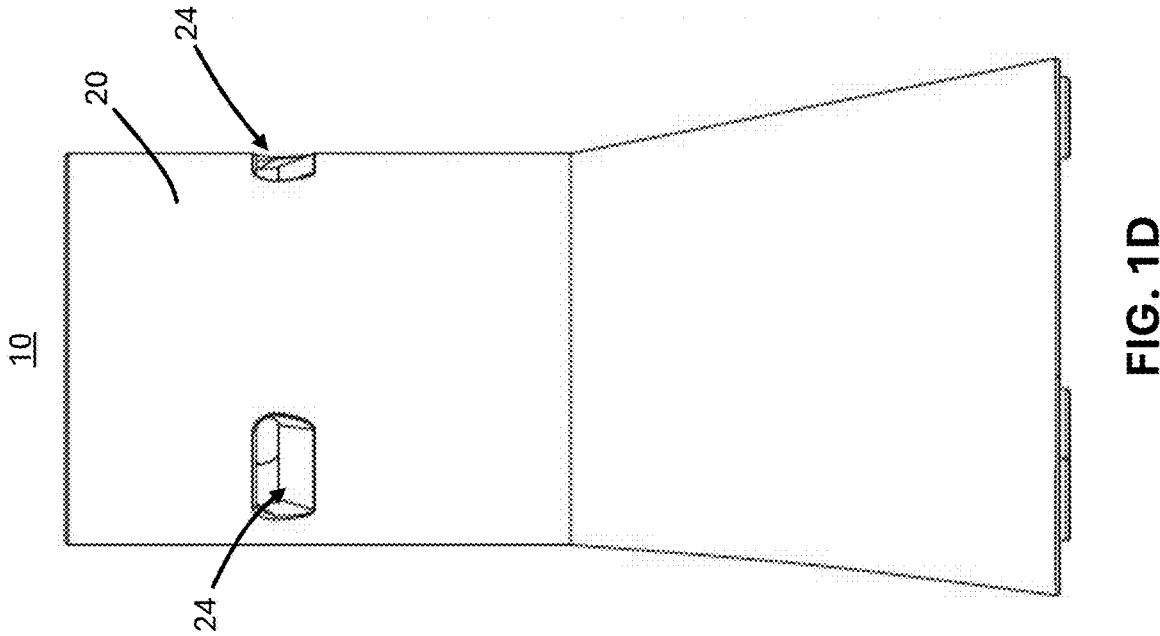
FIG. 1D is a right-side view thereof.
Figure 1C:
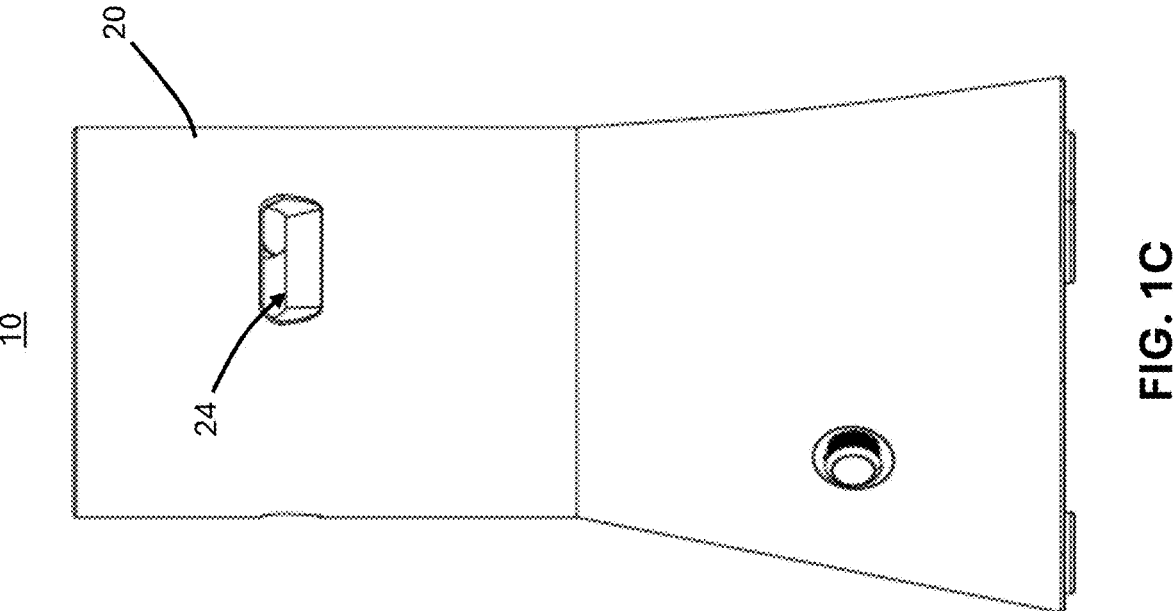
FIG. 1C is a front view thereof.
Figure 1F:
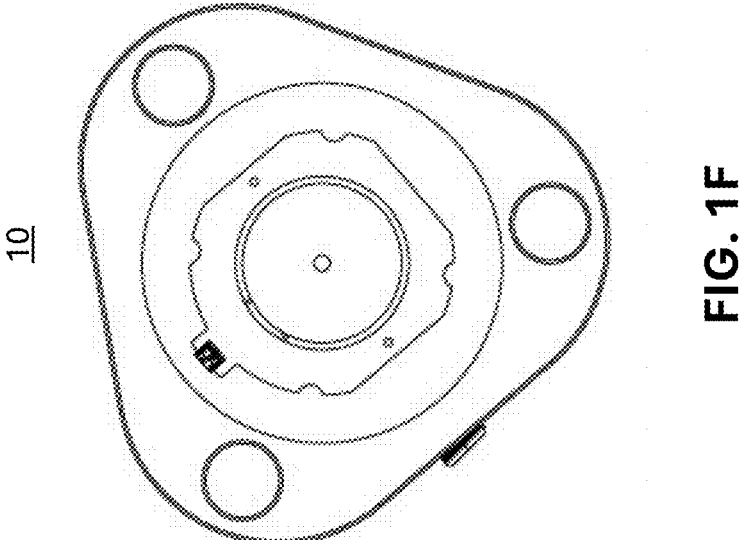
FIG. 1F is a bottom view thereof.
Figure 1E:
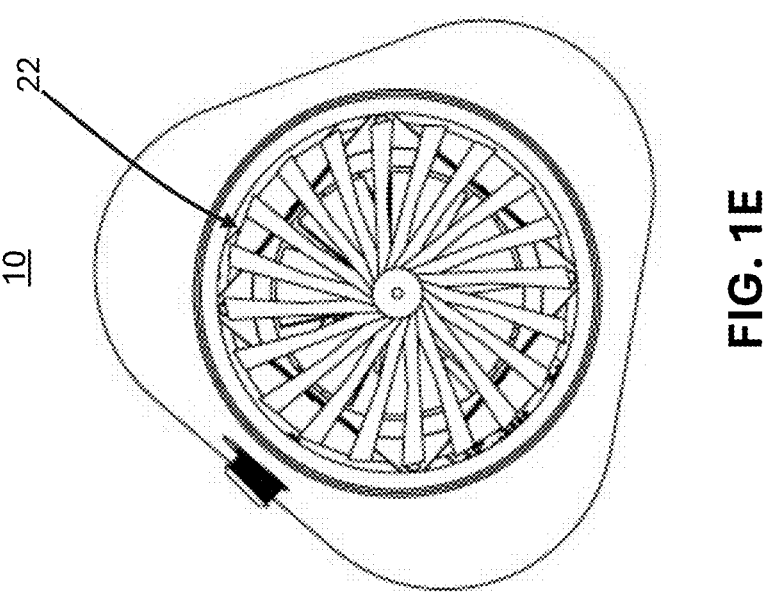
FIG. 1E is a top view thereof.

As shown in the accompanying drawings, and with particular reference to FIGS. 1A-1F, at least one embodiment of the present invention is generally directed to an olfactory sensoring device, generally referenced as 10. In particular, as described herein, the device 10 of at least one embodiment includes at least one, although in many cases, several chemical detection sensors or other types of sensors that are used to sense or detect one or more chemicals in the air and which can eventually be used to generate a chemical profile in the air. In several embodiments, particularly when several chemical detection or other sensors are used, sensor data from each of the various sensors can be collected and fused together in order to determine or approximate the chemical constituents in the air to a degree similar to a gas-chromatography, mass-spectrometry (GCMS) machine. In some embodiments, the sensor data and/or fused data can be run through one or more de-noising filters, statistical learning algorithms, artificial intelligence (AI) algorithms or modules, etc. to increase accuracy for the current and in some cases future readings. The entire process can, in some embodiments, take between 0.5 and 60 seconds and can repeat recursively while the device 10 is operating.

More in particular, as shown in the embodiment illustrated in FIGS. 1A-1F, the olfactory sensing device 10 includes a housing 20 with at least one opening or port, referenced as 22, 24 to allow a flow of air to enter an interior area 25 of the housing 20 and/or exit the interior area 25 of the housing 20, as described herein. In some cases, a single opening or port may be used to draw air into the housing 20 and expel air from the housing 20; however, in other embodiments, the housing 20 may include separate inlet and outlet ports.

For instance, in at least one embodiment, one or more intake or inlet ports 22 is/are formed in the housing 20 for drawing the flow of air into the housing 20 or otherwise into the interior area 25 thereof. Similarly, one or more separate outlet ports 24 is/are formed in the housing 20 for expelling the flow of air from the housing 20. It should be noted that in some embodiments or implementations, the inlet 22 and outlet 24 ports are formed on different areas, for example, different panels or different faces, of the housing 20. Such an arrangement is used to minimize the possibility that air expelled through the outlet port 24 is drawn back into the device 10 through the inlet port 22. Other configurations, in addition to or instead of forming the outlets 22, 24 on different areas of the housing 20, are contemplated to accomplish this objective, including, for example, by directing the flow of air exiting the outlet port 24 in a direction away from the inlet port 22. This can be done, for example, through angled surfaces formed on or near the outlet 24.

As just an example, and as shown in the embodiment illustrated in FIGS. 1A-1F, the housing 20 may include an inlet 22 formed at the top end or upper surface of the housing 20. One or more outlets 24 may be disposed or positioned on one or more sides or panels that extend between the top and bottom ends of the housing 20. The outlets 24 may include one or more downwardly directed or downwardly angled surfaces which operate to expel the flow of air exiting the housing 20 in a downward direction or otherwise in a direction away from the inlet 22. Of course, other configurations and positions of the inlet(s) 22 and/or outlet(s) 24 are contemplated within the full spirit and scope of the present invention.

Figure 2:
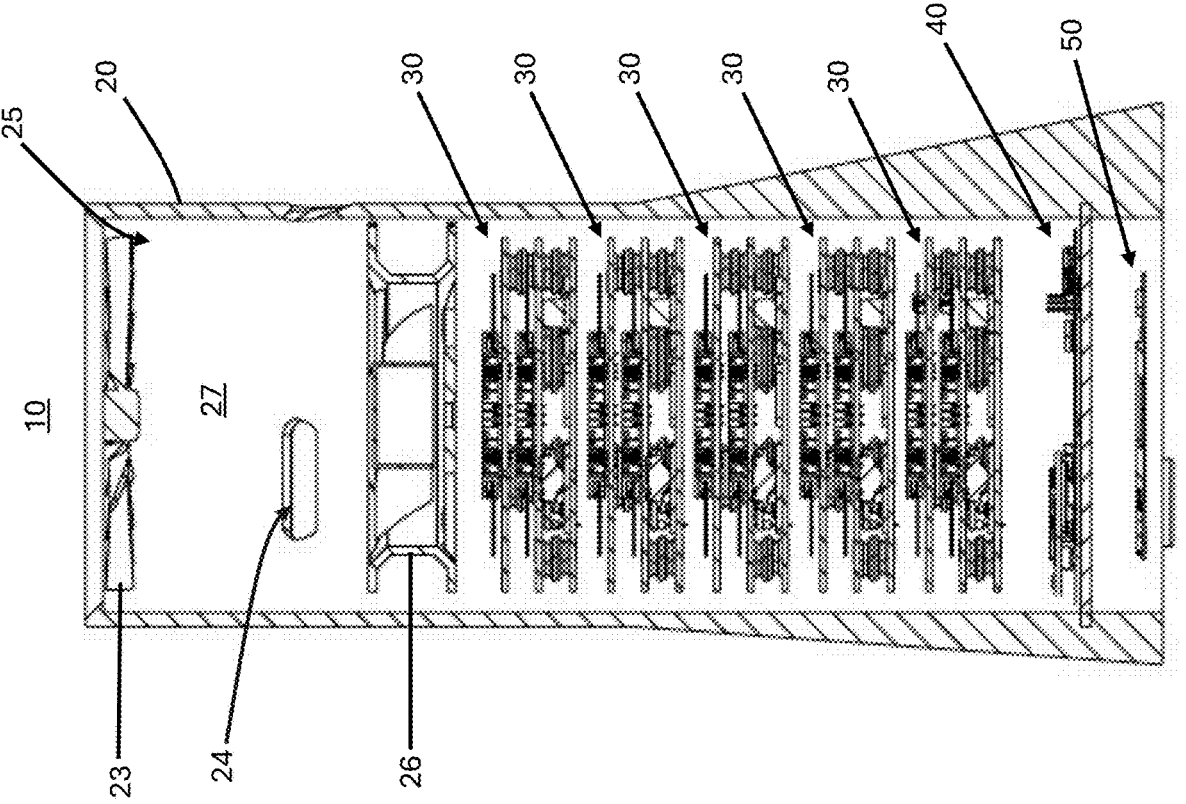
FIG. 2 is a cross-sectional view of the olfactory device along line 2-2 illustrated in FIG. 1B.

Turning now to FIG. 2, a cut-away or internal view of at least one embodiment of the olfactory sensing device 10 is shown. In this manner, the housing 20 is formed to define an interior area 25 within which the air entering the inlet 22 flows. Moreover, at least one intake fan 23 may be disposed within the interior area 25, and/or at or near the inlet 22 and configured to draw a flow of air through the inlet 22 and into the interior area 25. It should be noted that any number of inlet fans 23 may be used, including zero or no inlet fan or a plurality of or multiple inlet fans 23. In some cases, the positioning of the inlet fan 23, when included, may be in other locations inside, within or external to the housing 20, so long as the inlet fan 23 operates to draw the flow of air into the interior area 25.

Furthermore, one or more exhaust fans 26 may also be included in order to facilitate the flow of air from the interior area 25 through the outlet port(s) 24 and external to the housing 20. As shown in FIG. 2, the at least one exhaust fan 26 is positioned within the interior area 25 of the housing 20 adjacent to or proximate to, e.g., just below, the one or more outlet ports 24, however, other locations are contemplated.

Furthermore, as will be described further herein, in some embodiments, the olfactory sensing device 10 operates with several cycles, such as (a) an intake cycle which facilitates a flow of air through the inlet port(s) 22 and into the interior area 25, (b) a percolation or permeation cycle which allows the flow of air to circulate within the interior area 25, and (c) and exhaust cycle which facilitates the flow of air exiting the outlet port(s) 24. In this manner, the operation of the fan(s) 23, 26 can be selectively or automatically controlled (e.g., activated or turned on, deactivated or turned off, reverse flow, etc.) to facilitate operation of the various cycles described above. Additionally, in at least one embodiment, the inlet port(s) 22 and/or outlet port(s) 24 can be opened and closed during the different cycles in order to facilitate the desired flow of air.

In any event, the olfactory sensing device 10 of at least one embodiment of the present invention includes at least one, and in some cases, a plurality of olfactory processing units (sometimes referred to herein as an OPU). For example, in the embodiment illustrated in FIG. 2, five OPU's are shown disposed in a vertical alignment with one another within the interior area 25 of the housing 20. However, other embodiments may include any number of OPU's, for example, one or more, arranged in different orientations, e.g., whether vertically stacked or aligned or otherwise disposed in different non-aligned positions within the interior area.

With reference now to FIGS. 3A-6, an exemplary olfactory processing unit 30 is shown in accordance with at least one embodiment of the present invention. Specifically, in at least one embodiment, each OPU includes at least one base or plate 32a-c and at least one, although in many cases a plurality of sensors 34a-c including but not necessarily limited to chemical detection sensors. In some cases, as shown, at least some of the sensors 34a-c, including but not limited to electrochemical sensors 34a, photoacoustic sensors 34b, non-dispersive infrared sensors 34c, etc., are disposed on and/or otherwise arranged around the corresponding base 32a-c in a manner to receive the flow of air passing thereby or thereupon.

For example, the one or more sensors 34a-c of each OPU may include, but are not limited to, photo ionization sensors, metal oxide sensors, spectrometry/spectroscopy sensors, chromatography sensors, electrochemical sensors, Mach-Zehnder interferometer sensors, photo acoustic sensors, acoustic sensors, optical sensors, gravimetric sensors, oscillating crystal sensors, quantum vibration sensors, non-dispersive infrared sensors, or any other type of olfaction sensor. In some cases, each sensor 34a-c is tuned or configured to detect or sense a specific chemical compound (e.g., benzene) or a specific group of chemical compounds (e.g., hydrocarbons). Other types of sensors can also be used to measure the environment or air, including temperature sensors, pressure sensors, humidity sensors, etc. More specifically, in at least one embodiment, each OPU 30 or at least one of the OPUs 30 includes environmental sensors, such as one or more temperature sensors, one or more pressure sensors, and/or one or more humidity sensors. In this manner, the OPU 30, and the processing circuitry thereof, is able to correct olfactory measurements obtained by the olfactory sensors 30a-c based on the environmental sensor readings because even subtle variations in the environmental conditions (e.g., temperature, pressure and humidity) can impact the olfactory readings. The impact or the amount of impact of which the environmental conditions may have on the sensor readings may depend on the type of olfactory sensor(s) used, e.g., whether the olfactory sensors 34a-c are optical sensors, electrochemical sensors, acoustic sensors, etc.

Furthermore, each OPU 30 of at least one embodiment includes at least one potentiostat 36 that is configured to sense an electrochemical response of an odorant in the flow of air, and a processor, microcontroller, controller or CPU, referenced as 37, that is configured to process the sensed data received or otherwise obtained via the corresponding OPU 30. More specifically, the one or more potentiostats 36 is/are control and measuring devices that include an electric circuit that controls the potential across the cell by sensing changes in its resistance.

For instance, the processor 37 or processing circuitry may be realized as one or more hardware logic components and/or circuits, such as, but not limited to, microprocessor, microcontroller, field programmable gate arrays (FPGAs), application-specific integrated circuits (ASICs), application-specific standard products (ASSPs), system-on-a-chip systems (SOCs), digital signal processors (DSPs), and the like, or any other hardware logic components that can perform calculations or other manipulations of information.

In some embodiments, the OPU 30 may also include memory, storage device(s), network or communication interfaces, etc. The memory may be volatile (e.g., RAM, etc.), non-volatile (e.g., ROM, flash memory, etc.), or a combination thereof. In one configuration, computer readable instructions to implement one or more embodiments disclosed herein may be stored in the storage or memory. For example, in at least one embodiment, the memory is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processor 37 or processing circuitry, cause the processor 37 to perform the various processes described herein.

Additionally, in at least one embodiment, each of the bases or plates 32a-c of a common OPU 30 may be connected to one another, and in some cases, removably connected to one another, via one or more connectors 38. More specifically, each connector 38 of at least one embodiment, may include two or more corresponding and cooperative connector components 38a, 38b which connect to one another. In at least one embodiment, the connectors 38, and in particular the corresponding components 38a, 38b, thereof, are magnetic such that component 38a magnetically connects to or engages with component 38b, This allows the bases or plates 32a-c to be easily added to or removed from an OPU 30 such that that the OPU 30 is easily configurable and customizable with the addition or removal of any number of bases or plates 32a-c, and consequently, the sensors 34a-c and other components thereof.

In some embodiments, the connectors 38 are able to transmits or communicate data between (e.g., to and from) adjacent or connected bases 32a-c and/or between (e.g., to and from) the corresponding processor, microcontroller, or CPU 37. This allows the processor 37 to know which data streams are coming in (e.g., where the data came from) so that the processor 37 can accordingly adjust the processing thereof or other items such as the clock, power, etc. In this manner, each of the connectors 38, or at least one of the connectors 38, may exhibit cooperative pin connectors such that when the corresponding components 38a, 38b are connected, e.g., magnetically or otherwise, the pins align or connect, thereby allowing data to be transmitted there through.

It should also be noted that other embodiments may include other, non-magnetic or magnetic, connectors, including, but not limited to wired connections. For example, in some implementations or scenarios, the magnetic field of the magnetic connectors may impact, interfere with or throw off the accuracy of some sensors, particularly but not limited to electromechanical sensors at super low resolutions. In such a case, wired or non-magnetic connectors may be implemented.

In any event, turning to FIGS. 3A-3D, at least one embodiment of the OPU 30 is illustrated. In this embodiment, at least one of the cards or bases 32a includes a plurality of electrochemical sensors 34a (e.g., as seen from the top view of FIG. 3C), while other cards or bases 32b, 32c of the same OPU 30 may include other types of sensors, such as, but not limited to, one or more photoacoustic sensors 34b, one or more non-dispersive infrared sensors 34c, one or more other optical sensors, etc. Although eight electrochemical sensors 34a are shown arranged in a radial manner around the center opening 35, any number of sensors 34a, greater than or less than eight, can be implemented and disposed on a single one of the bases or plates 32a-c. Furthermore, although a radial configuration or arrangement of the sensors 34a is shown, other embodiments may arrange the sensors 34a in a different pattern or position on the bases or plates 32a-c.

Figures 3A, 3B:
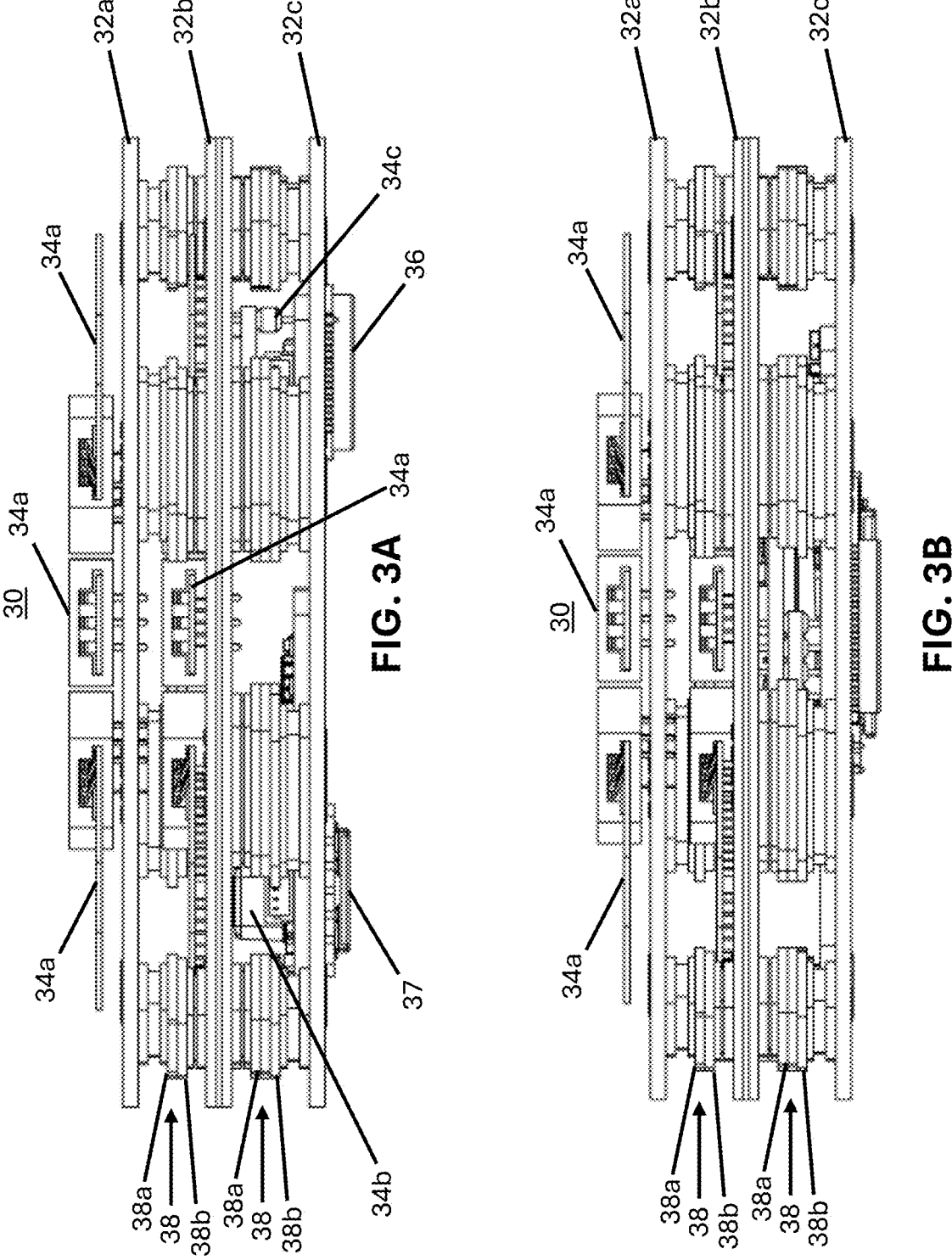
FIG. 3A is a side view of an olfactory processing unit as disclosed in accordance with at least one embodiment of the present invention.
FIG. 3B is a front view thereof.
Figure 3D:
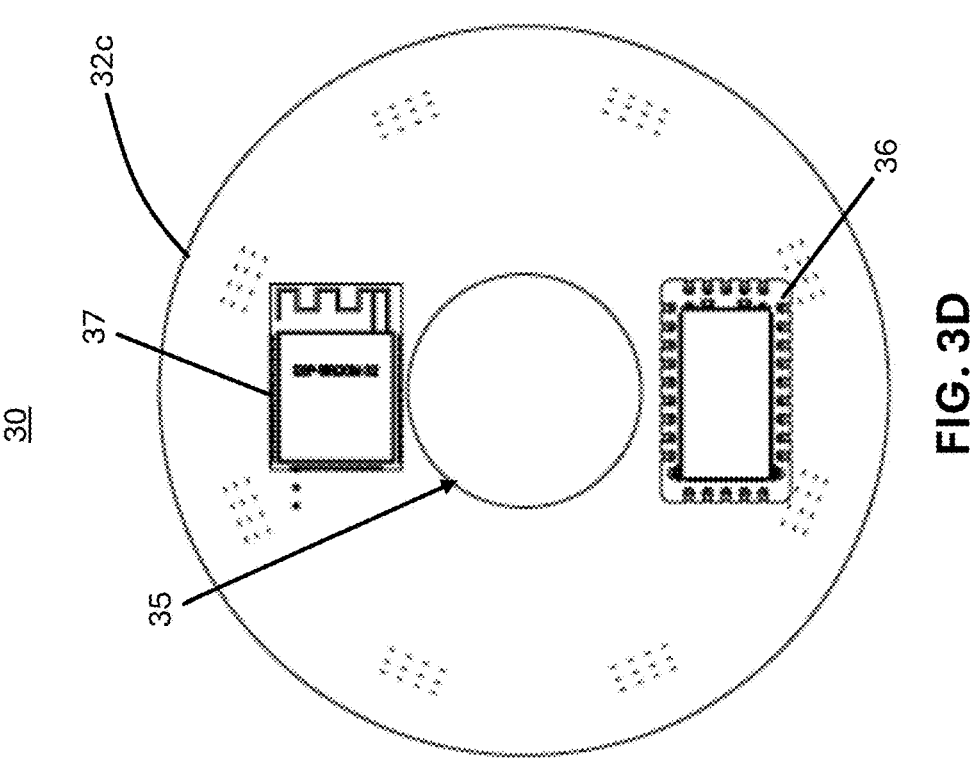
FIG. 3D is a bottom view thereof.
Figure 3C:
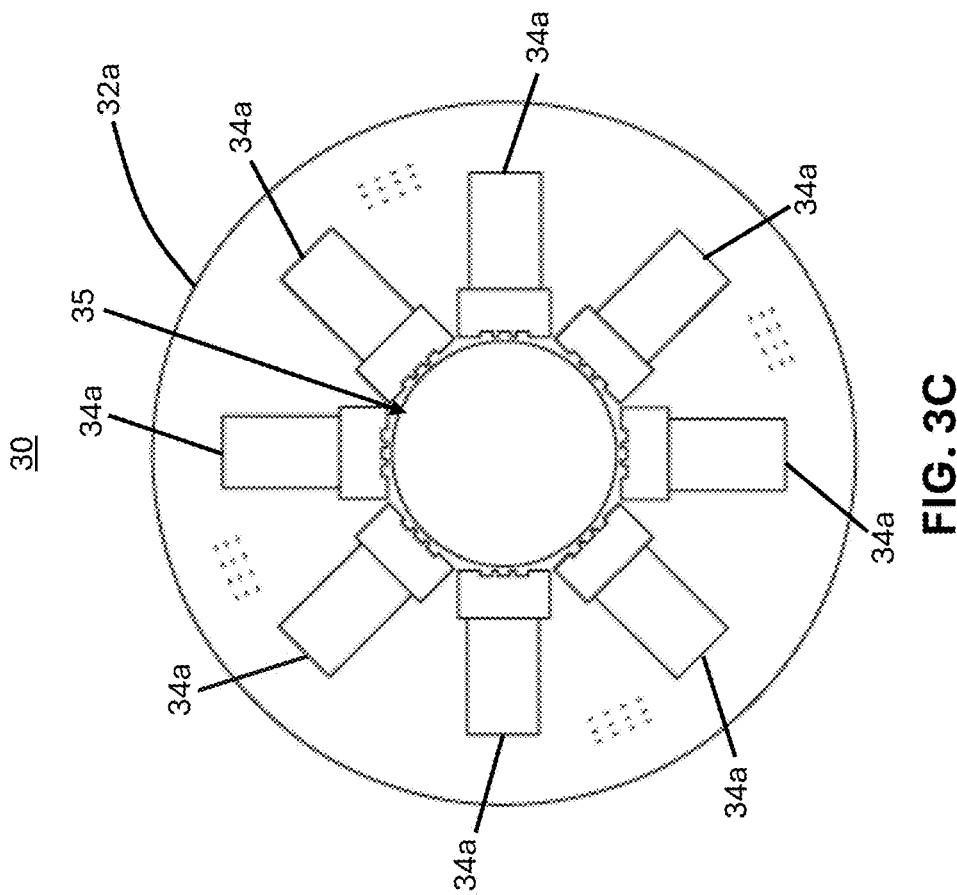
FIG. 3C is a top view thereof.
Figures 4A, 4B:
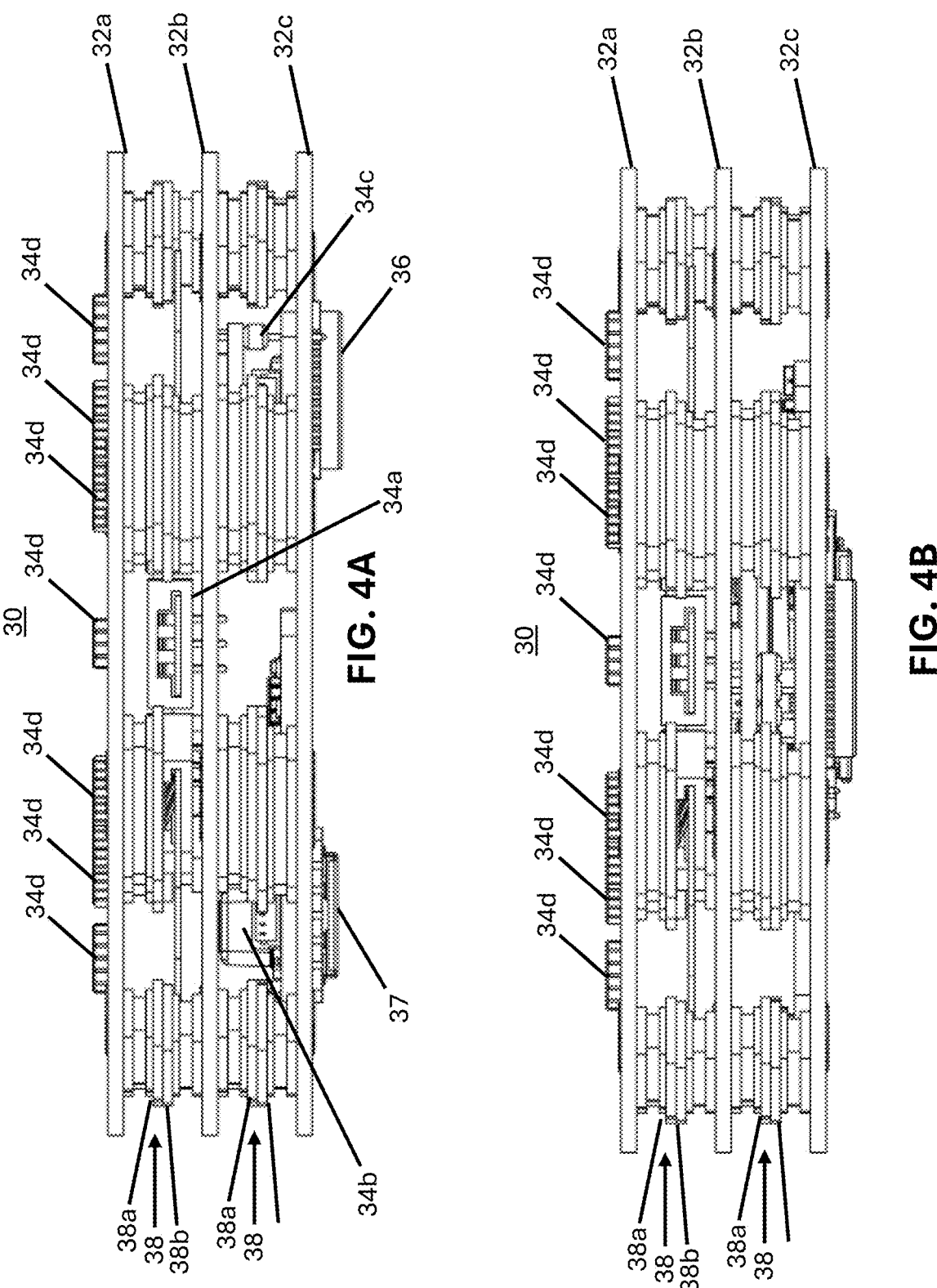
FIG. 4A is a side view of an olfactory processing unit as disclosed in accordance with another embodiment of the present invention.
FIG. 4B is a front view thereof.
Figures 4C, 4D:
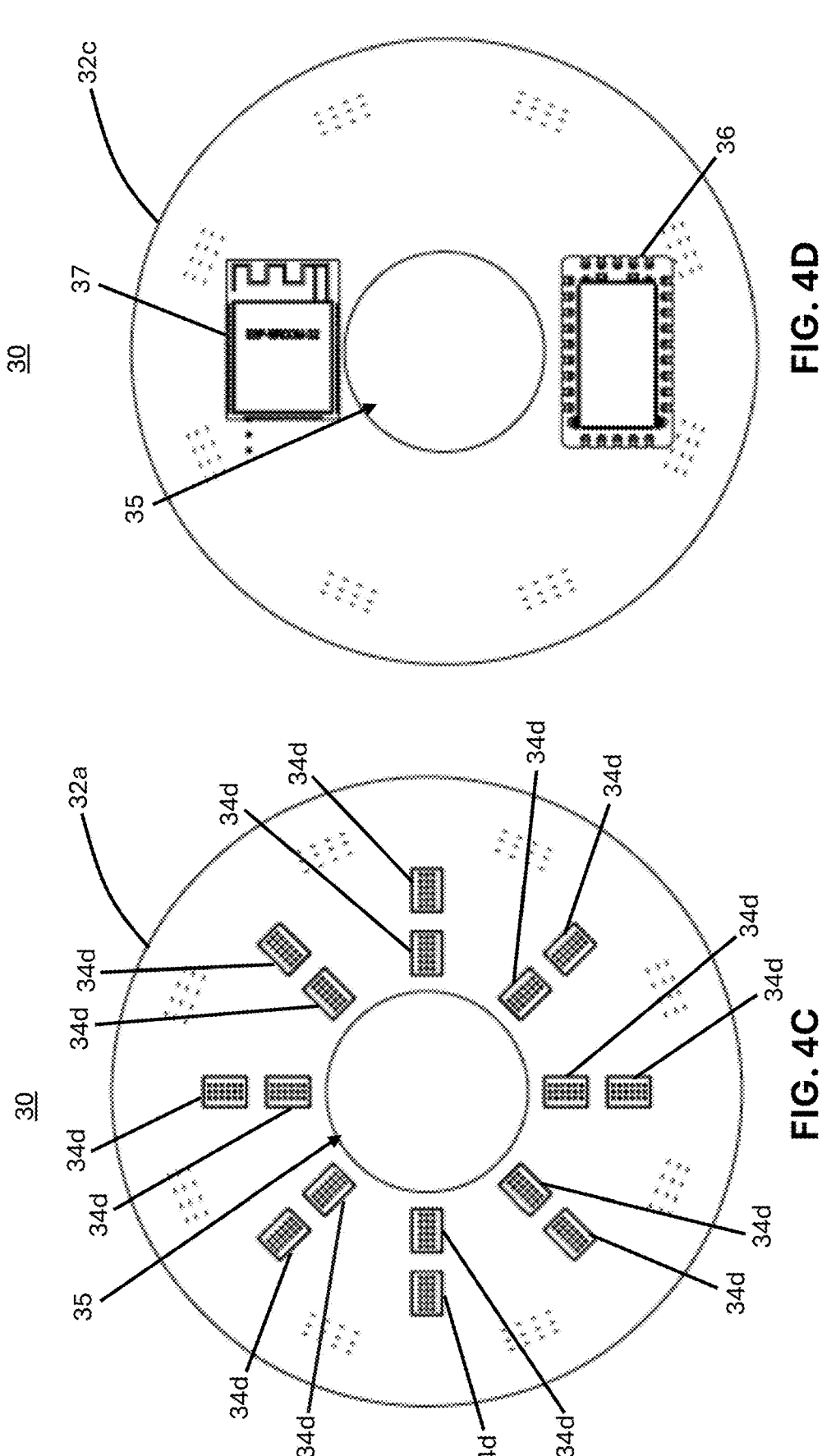
FIG. 4C is a top view thereof.
FIG. 4D is a bottom view thereof.
Figures 5A, 5B:
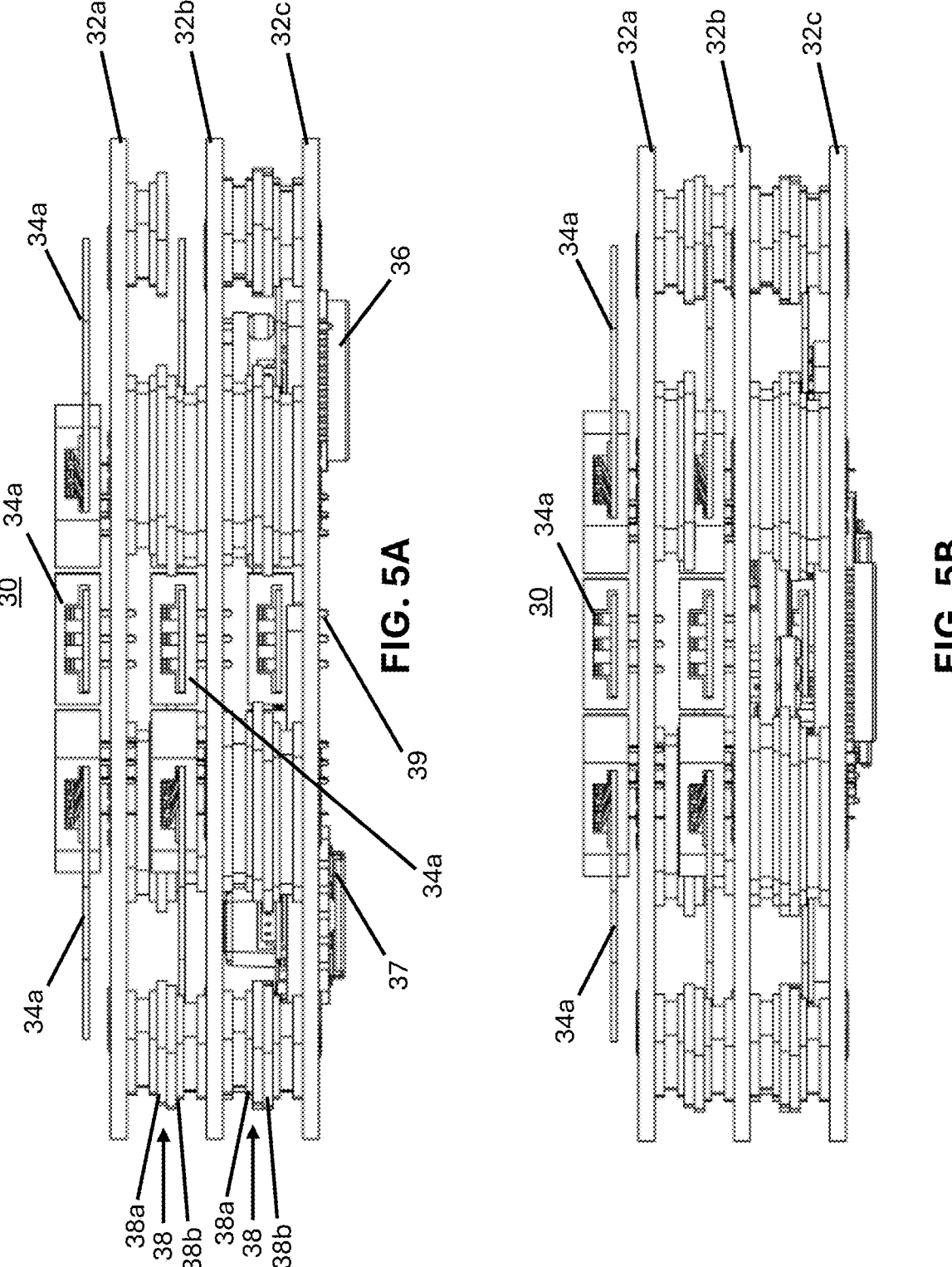
FIG. 5A is a side view of an olfactory processing unit as disclosed in accordance with yet another embodiment of the present invention.
FIG. 5B is a front view thereof.

Moreover, as shown by the bottom view of FIG. 3D, at least one of the bases, for example, the bottom base 32c of the OPU 30 may include a processor, microcontroller or CPU 37 communicate with, either directly or indirectly, the various sensors 34a-c. Furthermore, at least one potentiostat 36 may also be included on the bottom (or other) base 32c communicative with at least one of the processors 37 and/or the various sensors 34a-c, either directly or indirectly.

Referring now to FIGS. 4A-4D, another exemplary embodiment of the OPU 30 is shown. In this embodiment or example, a plurality of metal oxide sensors 34 are disposed on at least one of the bases or plates 32a, as shown by the top view of FIG. 4C. Although sixteen metal oxide sensors 34d are shown arranged in a radial and aligned manner around the center opening 35, any number of sensors 34d, greater than or less than sixteen, can be implemented and disposed on a single one of the bases or plates 32a-c. Furthermore, although a radial and aligned configuration or arrangement of the sensors 34d is shown, other embodiments may arrange the sensors 34d in a different pattern or position on the bases or plates 32a-c. It should also be noted that other types of sensors can be implemented or disposed on the various baes 32a-c of the OPUs 30 as disclosed herein. In other words, the sensors disposed on any one of the bases 32a-c, including the top base 32a, are not limited to the electrochemical sensors 32a shown in FIG. 3A-3D or the metal oxide sensors 34d shown in FIGS. 4A-4D.

Figures 5C, 5D:
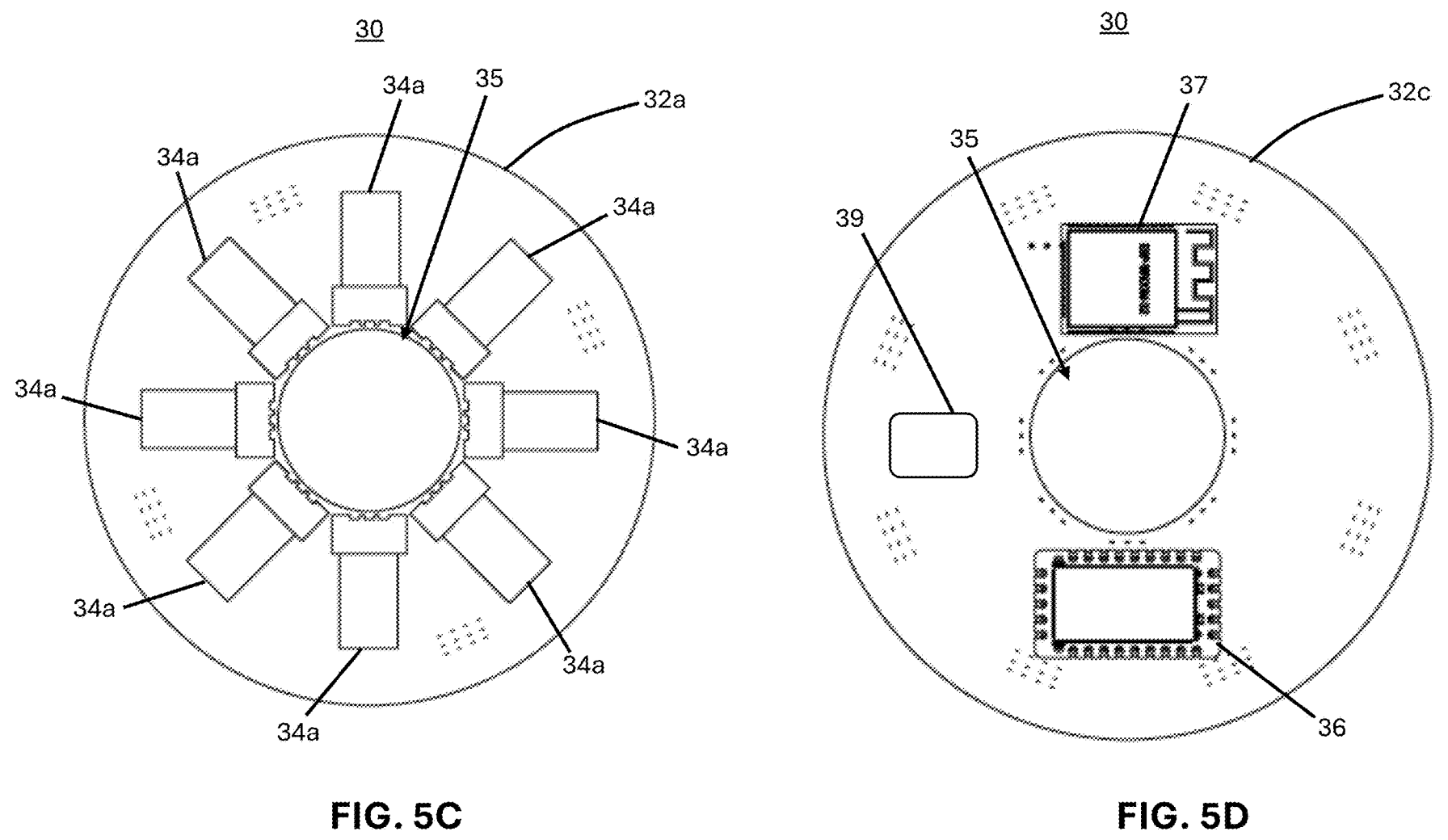

FIGS. 5A-5D illustrate yet another embodiment of the OPU 30. More specifically, in this embodiment, an inertial measurement unit (IMU) 39 may also be included and disposed in a communicative relation with at least one of the processors 37, the potentiostat 36, and/or one or more of the sensors 34a-d. The IMU 39 helps map the movement of the device 10 to the chemical plume or flow of air being analyzed. In this manner, the IMU may be used in a device 10 that is configured to be mobile or otherwise track the location or source of the chemical profile in the air. Accordingly, while the IMU 39 may be used in any of the devices disclosed herein, including the device 10 illustrated in FIGS. 1A-1F, the IMU 30 may be particularly beneficial in device 200, 250 (shown in FIGS. 9A-11F) that may be optimal for scent-based navigation.

Figure 6:
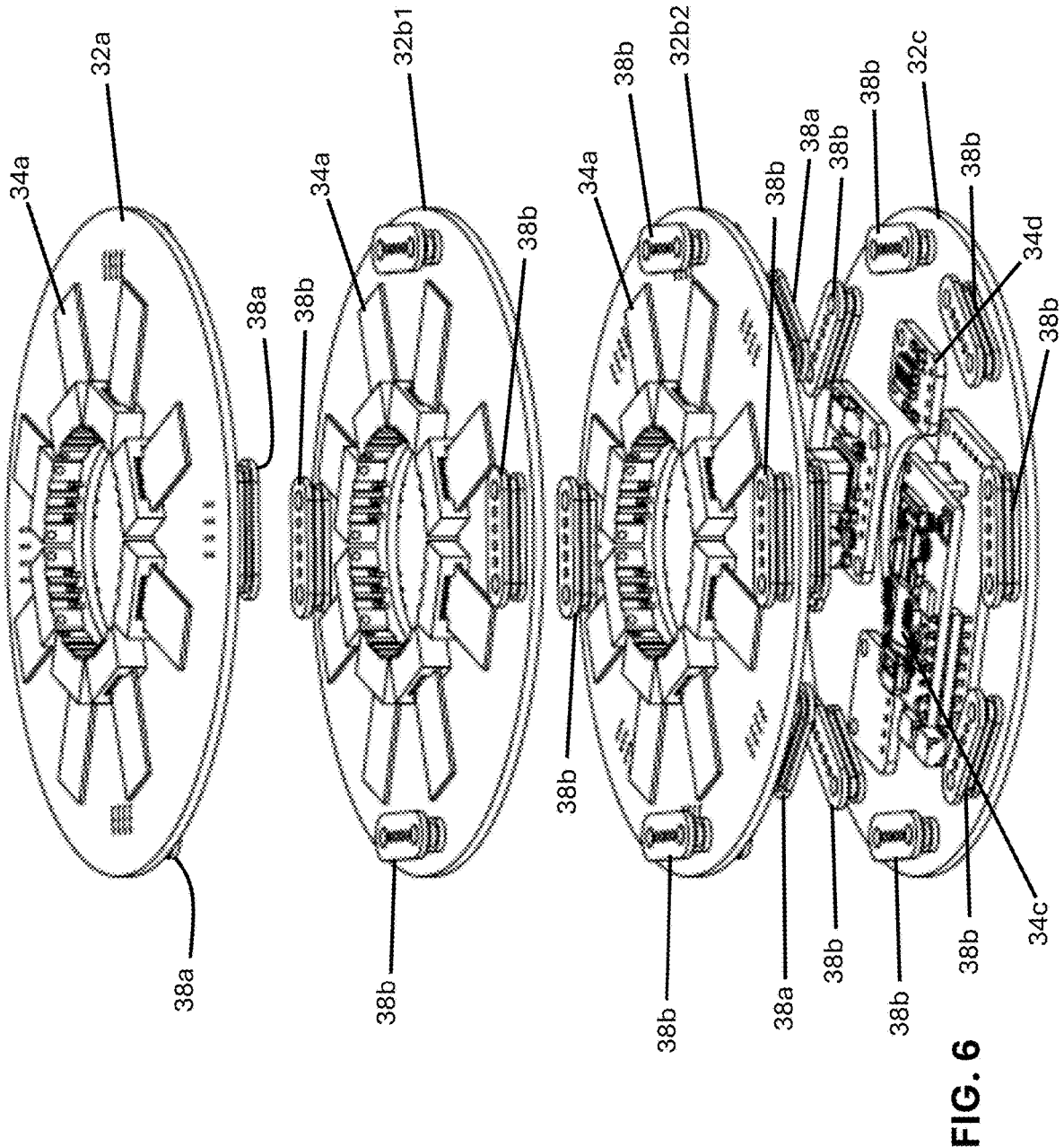
FIG. 6 is an exploded view of an olfactory processing unit as disclosed in accordance with at least one embodiment of the present invention.

FIG. 6 illustrates an exploded view of another embodiment of the OPU 30 which includes four bases 32a, 32b1, 32b2, 32c, with a top cards 32a, bottom card 32c and two middle cards 32b1-32b2.

With reference again to FIG. 2, the device 10 of at least one embodiment also includes a main controller 30 disposed in a communicative relation with each of the one or more OPUs 30, or otherwise with each of the processors 37, potentiostats 36 and/or IMUs 39 of the OPUs 30. The communication between the OPUs 30 and the main controller 40 may be implemented through wired or wireless communication protocols or modules, including but in no way limited to direct or indirect wired connections, WI-FI. Bluetooth, Zigbee, NFC, etc.

Furthermore, with each OPU 30 having its own processor 37, the device 10 of at least one embodiment operates to facilitate parallel processing in that each processor 37 of each OPU 30 receives and processes sensed data from its own corresponding OPU 30 and/or the sensors 34a-d thereof and communicates the sensed data and/or processed data to the main controller 40 or main processor thereof. In this manner, the plurality of OPUs 30 and the main controller 40 of at least one embodiment are communicatively arranged to form a physical artificial neural network.

More specifically, most computers used in the world today (with some exceptions, such as a quantum computer) follow the Von Neumann architecture in separating memory and processing into distinct units. A true neuromorphic computer, however, is an event-driven (not a clock-driven) computer that fuses memory and processing together into the same units. Olfactory processing can benefit from neuromorphic computing because all of the sensors (each of which can be configured to detect a specified or distinct compound or group of compounds) can simultaneously register information or data. Neuromorphic computers benefit from parallelism which can be accomplished with multi-core conventional computers.

While several embodiments of the olfactory sensing device 10 of the present invention are implemented as a true neuromorphic computing device, other embodiments can be constructed and arranged in a way to generate a physical artificial neural network that creates a neuromorphic-like computer with several Von Neumann microcontrollers or processors 37, 40.

Again, each OPU 30 (which act as sensor nodes and/or pseudo-neuromorphic units) in this environment or embodiment includes (a) one or more potentiostats 36 sensing the electrochemical response of an odorant, (b) a microprocessor or processor 37 that preprocesses the signals or data received by the sensors 34*a-d* and/or potentiostat 36, for example, to perform amplification, filtering and/or normalization to the signals, (c) a spike generator that converts sensor readings into spikes (e.g., voltage changes, rate encoding, or event-driven changes), and (d) wireless or wired communication module for transmitting data, for example, to the main controller 40.

For example, since the potentiostats 36 measure current from redox reactions, the system or device can convert the analog signal into spikes using one or more techniques, such as, but not limited to rate coding (convert the current magnitude into spike frequency; higher current means a higher frequency), latency coding (use the time delay from stimulus onset to spike generation as an encoding method), and/or phase encoding (align spike times with an oscillatory reference signal).

Accordingly, each of the OPUs 30 are linked through interconnected processing units, which can be considered the cortical layers. For example, multiple processors or microcontrollers 37 act as distributed neurons. Each of the microcontrollers or processors process the signals by receiving the spike inputs, applying a weight (simulating synaptic strength), and passing the output to the next processing stage.

The nodes or OPUs 30 are routed to the main controller 40 which acts as a central neuromorphic controller or olfactory cortex. The main controller 40 may include, for example, an FPGA or other perhaps more powerful controller or processor (e.g., STM32H7, Teensy, Raspberry Pi RP2040, etc.) that aggregates or fuses the data and performs higher-level processing on the data.

For instance, the controller 40 or processing circuitry may be realized as one or more hardware logic components and/or circuits, such as, but not limited to, microprocessor, microcontroller, field programmable gate arrays (FPGAs), application-specific integrated circuits (ASICs), application-specific standard products (ASSPs), system-on-a-chip systems (SOCs), digital signal processors (DSPs), and the like, or any other hardware logic components that can perform calculations or other manipulations of information.

In some embodiments, memory, storage device(s), network or communication interfaces, etc. may also be included and communicative either directly or indirectly with the controller 40. The memory may be volatile (e.g., RAM, etc.), non-volatile (e.g., ROM, flash memory, etc.), or a combination thereof. In one configuration, computer readable instructions to implement one or more embodiments disclosed herein may be stored in the storage or memory. For example, in at least one embodiment, the memory is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the controller 40 or processing circuitry, cause the controller 40 to perform the various processes described herein.

In some embodiments, the main controller 40 implements a learning algorithm such as Spike-Timing-Dependent Plasticity (STDP), Reinforcement Learning (RL) or other AI platforms, system or algorithms for pattern recognition. It should be noted that the main controller can also integrate with an existing neuromorphic chip (e.g., Intel Loihi, SpiNNaker) for further processing.

Still referring to FIGS. 3A-6, in at least one embodiment, the OPUs 30 and in particular, the base(s) 32*a-c* thereof, include one or more openings or holes 35 formed there though. In some embodiments, and as illustrated in FIGS. 3C, 4C, and 5C, for example, the sensors 34*a-d* may be disposed in a radial manner around the opening 35 and in communication with the flow of air. More specifically, with each of the OPUs 30 disposed in an aligned, e.g., an axially aligned, orientation, as generally shown in FIG. 2, openings 35 of each of the OPUs 30 collectively form a channel through which the air can easily flow. As air flows through the channel defined by the openings 35 of each of the OPUs 30, the air is interfaced with or flows directly over at least some of the sensors 34*a-d*, which, as illustrated are positioned in a manner around the openings 35 to obtain or receive the most amount of air flow.

It should also be noted that the olfactory sensing device 10 of at least one embodiment is connected to or includes a power source, such as one or more rechargeable batteries, replaceable batteries, and/or charging electronics, generally referenced as 50. In particular, the device 10 of at least one embodiment may include one or more internal rechargeable batteries and inductive charging electronics capable of charging the battery when wirelessly or otherwise connected to a power source. In some cases, or embodiments, the device 10 and/or power electronics 50 may be connected to an external power source through a cable (not shown).

In any event, the internal power source and/or electronics 50 is connected to the main controller board 40 and/or the OPUs, fan(s), etc. in order to operate the various features of the several embodiments disclosed herein.

Figure 7B:
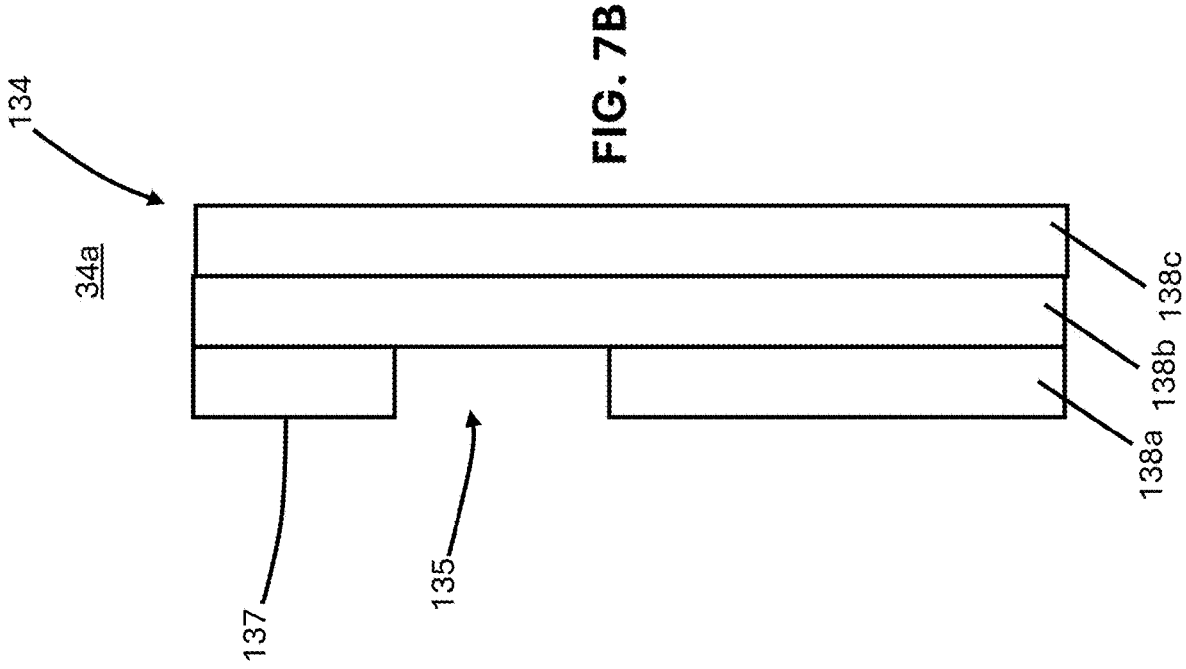
FIG. 7B is a cross-sectional view along line 7B-7B of the electrochemical sensor illustrated in FIG. 7A.
Figure 7A:
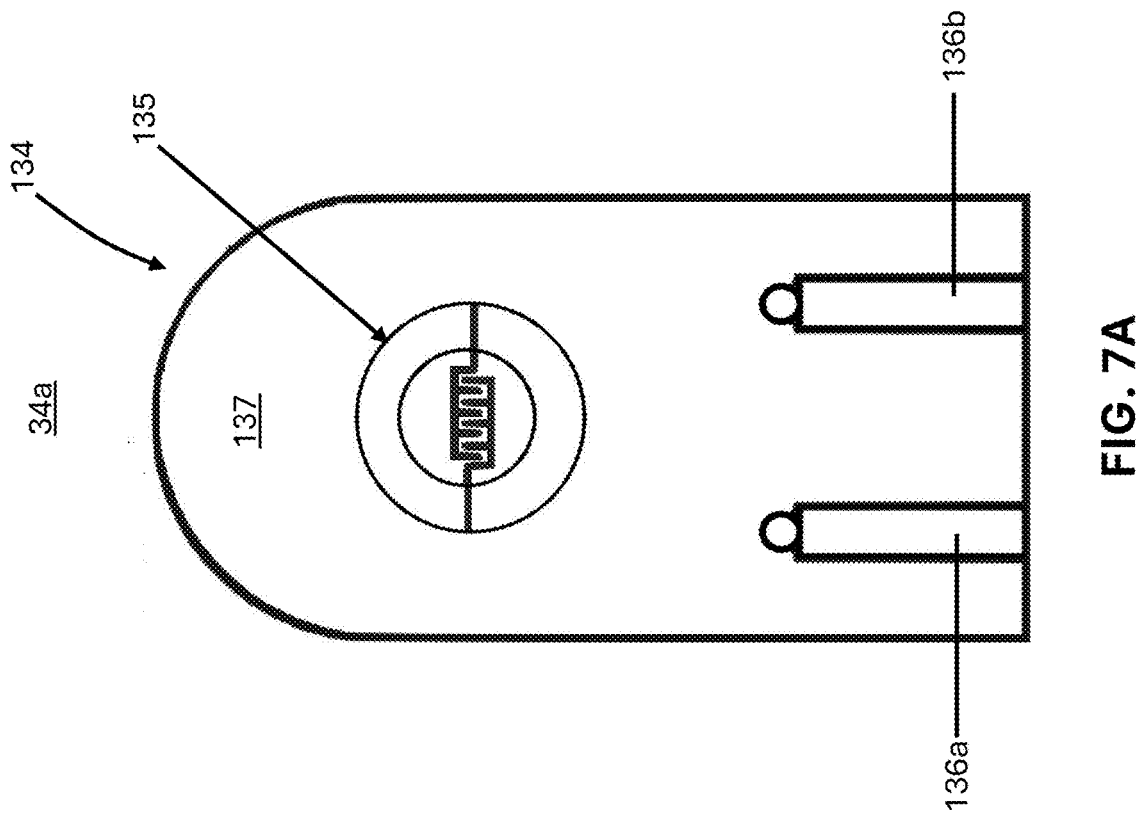
FIG. 7A is a top view of an electrochemical sensor as disclosed is accordance with at least one embodiment of the present invention.

Furthermore, with reference now to FIGS. 7A and 7B, an exemplary sensor 34*a* is illustrated, which in this embodiment includes an electrode 134. More specifically, in some cases, an electrode 134 operates as a sensor 34*a*, for example, an electrochemical sensor. The electrode 134 of at least one embodiment can act as a transducer that converts a chemical interaction into an electrical signal that can be measured.

Figure 7C:
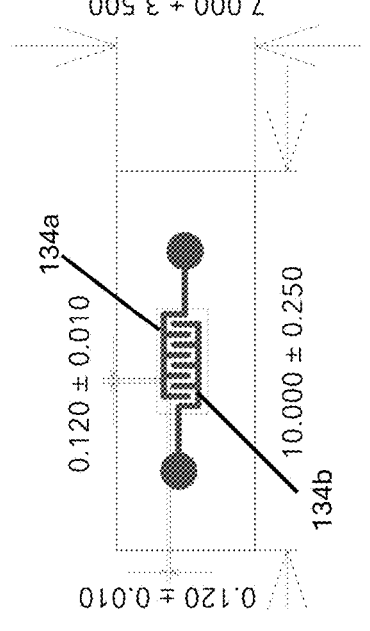
FIG. 7C is an exemplary layout of the interdigitated electrode design illustrating some measurements thereof, all of which are provided in millimeter (mm) units.
Figure 7D:
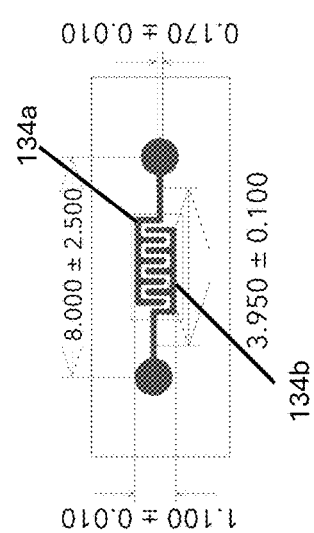
FIG. 7D is another exemplary layout of the interdigitated electrode design illustrating some measurements thereof, all of which are provided in millimeter (mm) units.
Figure 7E:
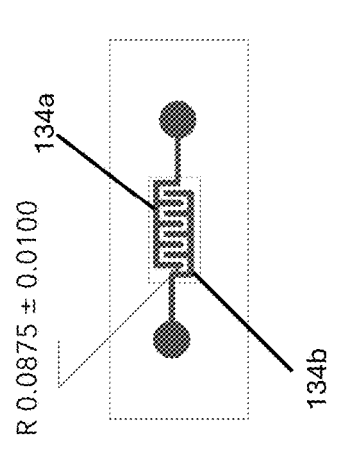
FIG. 7E is yet another exemplary layout of the interdigitated electrode design illustrating some measurements thereof, all of which are provided in millimeter (mm) units.

In several embodiments of the present invention, the electrode 134 and/or sensor 34*a*, for example, the shape, geometry and/or construction thereof, optimizes detection of chemicals or chemical compounds in the air at very low concentrations (e.g., part-per-trillion resolution). More specifically, the electrode 134 of at least one embodiment may include an interdigitated electrode in that two electrodes 134*a*, 134*b* (as shown in FIGS. 7C-7E) weave together like a crossword puzzle or like a zipper. For example, the two electrodes may have comb-like arrays with the fingers, digits or extensions of each electrode interlacing with the other to create the zipper-like configuration. In many cases, the electrodes may be constructed from gold, copper, platinum, or other conductors; however, other materials are also contemplated and within the full spirit and scope of the present invention.

It should be noted, however, that the electrodes 134 used in connection with other or several embodiments of the present invention may have a different shape, geometry and/or construction than the electrode 134 shown in FIGS. 7A and 7B.

For example, FIGS. 7C-7D illustrate an exemplary layout and configuration of the interdigitated electrodes 134a, 134b and the distances between the digits (e.g., 0.120+/−0.010 mm), the width of the electrode lines (e.g., 0.170+/−0.010 mm), and other exemplary measurements, all of which are provided in millimeters (mm). Of course, the measurements, distances, thicknesses, etc. illustrated in FIGS. 7C-7E are provided for exemplary purposes and should not be considered limiting in that other embodiments within the full spirit and scope of the present invention may have a different configuration and/or measurements with regard to the interdigitated electrodes 134a, 134b.

Furthermore, in at least one embodiment, and as shown in the example of FIGS. 7A-7B, the sensor or electrode 134 includes a two-electrode design or configuration due to the two electrode lines 136a, 136b. For example, there are often three electrode lines between or otherwise coming from a potentiostat 36 to a sensor 34a for electrochemical measurements referenced as a working electrode (WE) line or pin, a counter electrode (CE) line or pin, and a reference electrode (RE) line or pin. In some electrochemical sensing techniques, such as but not limited to chronoamperometry (which is a technique or method used in connection with some embodiments of the present application), the reference electrode (RE) and counter electrode (CE) lines can be shorted together, such the two electrode lines 136a, 136b of the electrode 134 can be the WE line and the RE/CE line. However, it should also be noted that other embodiments of the present invention can use electrodes with three (or more) lines, which in some cases can be beneficial for other techniques or methods, such as electrical impedance spectroscopy.

Moreover, with reference now to FIG. 7B a basic cross-sectional view of the electrode 134 is shown, illustrating an electrolyte well 135 and a plurality of layers 138a-c of at least one embodiment. In some embodiments, the layers of the electrode 134 or sensor 34a may include a top layer 138a formed of a PCB substrate or base material for a printed circuit board. In this manner, layer 138a may include, but is in no way limited to a dielectric material such as fiberglass-reinforced epoxy resin, etc. The next or middle layer 138b of at least one embodiment includes the electrode layer and may be formed of the electrode and a dielectric material. The bottom or base layer 138c may be formed of a PCB substrate such as, for example, a dielectric material such as fiberglass-reinforced epoxy resin, etc.

Figure 7F:
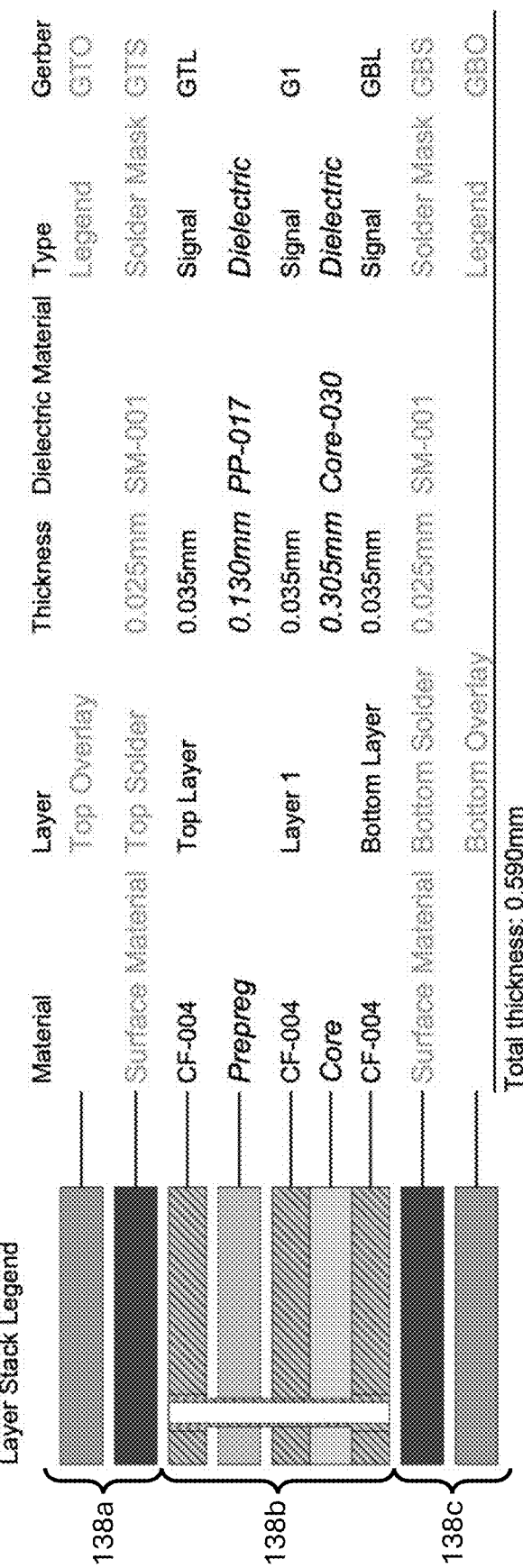
FIG. 7F is an exploded view illustrating several layers of the PCB layer stackup as disclosed in accordance with at least one exemplary embodiment of the present invention.

More specifically, FIG. 7F shows a more detailed view of the PCB layer stackup in the sensor electrode design of at least one embodiment. For instance, the layers or sections 138b between the "surface material" layers 138a, 138c comprises the electrode. Ther are three signal layers that have a dielectric material in each between for shielding. In particular, the GTL, Top Layer is a signal layer near the surface that carries one electrode line (e.g., the working electrode or WE line). The G1, Layer 1 is an internal signal layer that is used as a ground plane and for shielding between electrode lines to reduce noise, but it can also carry connections between both electrode lines, if needed. The GBL, Bottom Layer is a signal layer at the bottom that carries the second electrode line (e.g., the reference electrode RE+counter electrode CE shorted together).

The PCB could still route signals or power between different layers. For example, one electrode line might route partly on the GTL and partly on the G1 or GBL layers to reach the pad or contact point conveniently. This routing may depend on mechanical design/space needs. For a three-electrode design, layer G1 simply becomes another electrode signal layer in between the other two electrode layers. In many cases, it does not matter which layer houses WE, RE or CE.

Of course, it should be noted that other designs, layouts or configurations not shown in FIG. 7F are contemplated within the full spirit and scope of the present invention in that the layout shown in FIG. 7F is provided for illustrative purposes only.

Furthermore, the sensor 34a or electrode design 134 of at least one embodiment includes a well 135 formed on the top surface 137 and/or within the top layer 138a. As shown, the well 135 of at least one embodiment extends through the top layer 138a and to the electrode layer 138b. In any event, the well 135 is configured to retain a material therein, such as one or more ionic liquids, an electrolyte, etc.

More specifically, when an electrolyte is added to the electrode, a transducer is formed to facilitate the flow of electrons across the electrode lines. Electrolytes are often in a liquid form, so they tend to run due to having a low viscosity. In some embodiments, there is a uniform or other distance between the top surface 137 of the electrode 134 and the top of the electrolyte material or the surface area of the electrolyte that is exposed to the environment.

In this manner, the well 135 of at least one embodiment retains the electrolyte therein and restricts the electrolyte from sloshing around. In some embodiments, the well 135 may be formed with a depth D of between 100 and 150 microns, however, other depths can be implemented whether shallower than 100 microns or deeper than 150 microns.

Moreover, the electrolyte or other like material (not shown) is often a room-temperature ionic liquid (RTIL), however, the material selected or used can be any other transducer material that facilitates the flow of electrons. In at least one embodiment, the amount of electrolyte material disposed in the well 135 is less than approximately 10 microliters (uL) and the viscosity and/or surface tension of the material is enough to prevent or restrict the material from running and is maintained in place (in the well) go approximately 3Gs of force.

However, in some embodiments, the electrolyte or material can be mixed with other materials, such as but not limited to Nafion, which can increase the viscosity of the electrolyte material (e.g., by forming the material into a gel or paste) and limit or lower the sloshing of the material. However, adding Nafion or other like materials or additions, although potentially helpful in rugged applications where the risk of smudging the RTIL is large, can cause the electrode or sensor to lose sensitivity because the electron flow is lowered or limited.

Some embodiments of the electrode or sensor may include a cover, such as but not limited to a fine polymer (or other) mesh, an air HEPA filter, etc. that covers or lays over the RTIL The cover (not shown) may include pore or opening sizes that are large enough to let air penetrate but keeps the electrolyte material in place in the well 135. The cover, which can be placed a few millimeters above the sensor to prevent rust or debris from attaching itself to the electrolyte.

It should also be noted that, in some embodiments, each time the electrochemical sensors 34a are exposed to a high concentration (or in some cases, even lower concentrations) of the target compound, the target compound effectively attaches itself to the electrolyte material. This can compromise further detections because the sensor is now saturated, and the transduction of electrons is much lower. In at least one embodiment, the present invention can implement a joule heating technique that "burns off" the target compound. In order to implement a joule heating technique, a voltage (in many cases a high voltage) is sent from the OPU's potentiostat 36 to the sensor 34a. This burns off the target compound and resets the sensor for additional detection cycles. In this manner, the sensor(s) 34a of at least one embodiment are configured to be able to withstand this high voltage without damaging the electrode and/or without chemically altering the composition of the RTIL from the heat.

In some cases, the sensor(s) 34a are configured to give off a certain pattern when they are close to saturation. Accordingly, in at least one embodiment, the software onboard the OPU 30 is programmed to identify these patterns and send the joule heating voltage to the sensor(s) 34a to reset them when necessary. The voltage can be sent along the same electrode lines that facilitate the sensor measurements. The electrode material, dielectrics of the PCB, RTIL, target compound and other material properties influence the voltage, duration and pattern of the joule heating sequence that needs to occur.

It should also be noted that if a device 100, 200, 250 and/or a robot, is given the task of tracking a particular element or compound, such as nitrogen monoxide or NO, the relevant sensor must be placed onboard on the device. However, NO creates nitrogen dioxide or NO2 over time as it reacts with oxygen, so if the device takes too long to navigate to the NO scent, it now fails. In some cases, the same olfaction sensor used to detect NO cannot also detect NO2—this requires a hardware change on the device. So, in some cases, it may be helpful to understand all the near-neighbor molecules of NO before the device is deployed so that the necessary olfactory sensors can be integrated onto the device. In some embodiments of the present invention, the OPUs contain neighboring algorithms onboard, such as K-nearest neighbors (KNNs), denoising diffusion probabilistic models (DDPMs), and graph neural networks (GNNs) to facilitate this. So, if a user wants to deploy a device 100, 200, 250, etc. to detect a target compound, these neighboring algorithms can be used to get all near neighbor molecules of the target compound beforehand so that all such olfactory sensors can be integrated onto the device before deployment.

Figures 8A, 8B, 8C:
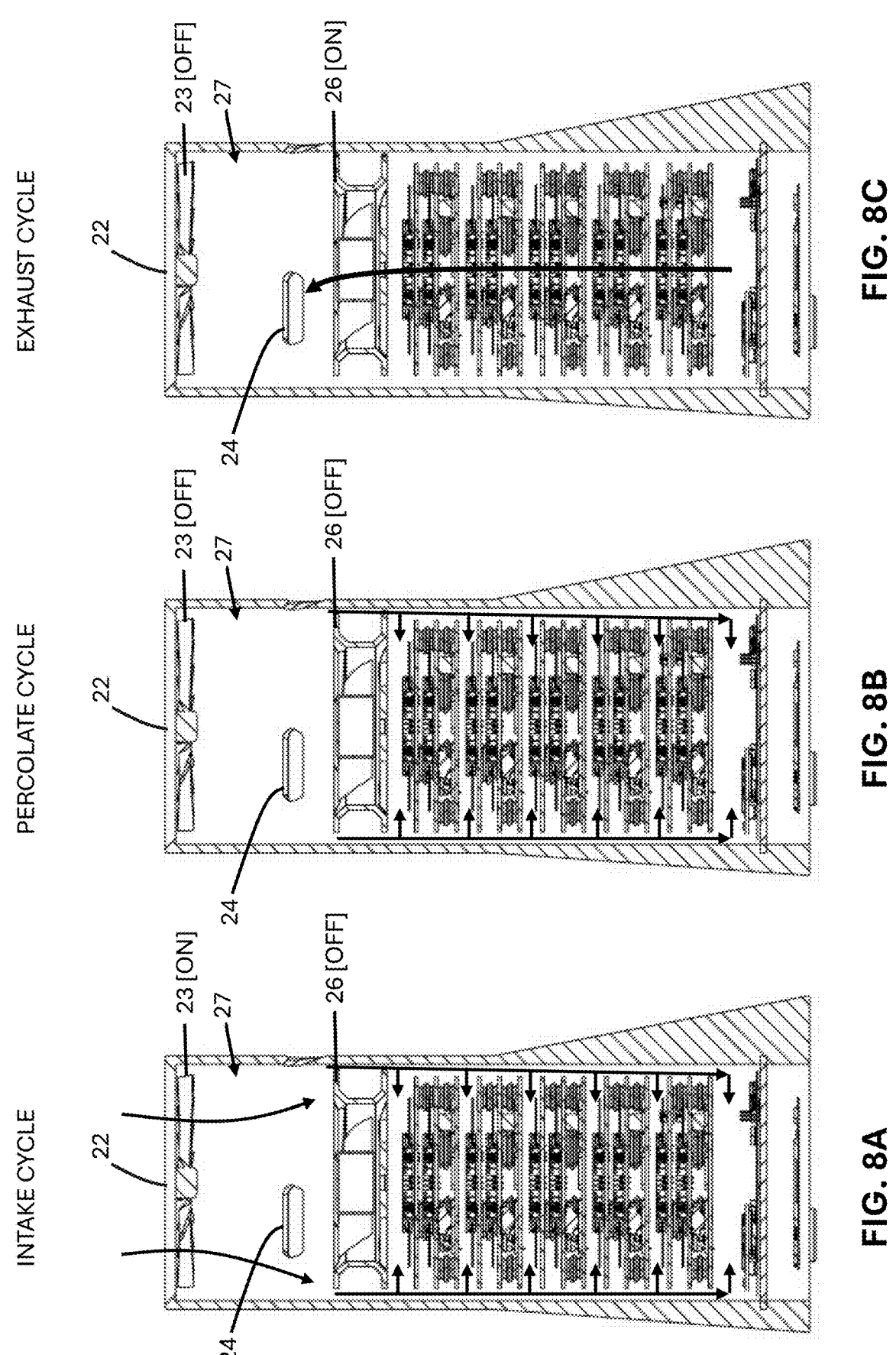
FIG. 8A is a cross-sectional view of the olfactory sensoring device illustrating the intake cycle as disclosed in accordance with at least one embodiment of the present invention.
FIG. 8B is a cross-sectional view of the olfactory sensoring device illustrating the percolate cycle as disclosed in accordance with at least one embodiment of the present invention.
FIG. 8C is a cross-sectional view of the olfactory sensoring device illustrating the exhaust cycle as disclosed in accordance with at least one embodiment of the present invention.

FIGS. 8A-8C illustrate exemplary cycles of the device 10 in operation. For example, FIG. 8A illustrates an intake cycle which is designed to draw air through the inlet port 22 and into the interior area 25 of the housing 20, as represented by the arrows. For instance, during the intake cycle, the intake fan 23 is activated or otherwise turned on in a manner to draw air in the direction of the arrows through the inlet port 23. In some cases, the exhaust fan 26 is off or deactivated during the intake cycle shown in FIG. 8A. Moreover, in some cases, the outlet port(s) 24 may be closed in order to prevent or restrict air from escaping the interior area 25, while the inlet port(s) 22 is open for drawing air in. This provides a manner in which the air is effectively drawn into the interior area 25 of the housing 20 where the air can circulate and flow through the device 20 interfacing with the OPUs 30 and sensors 34a-d thereof.

Furthermore, in at least one embodiment, directly beneath the inlet 22 and intake fan 23, there is an open space, generally referenced as 27, which provides an area to enhance flow path geometry of the air. This space 27 allows the flow of air to circulate and mix within the interior area prior to flowing down or toward the OPUs 30.

With reference now to FIG. 8B the percolation or permeation cycle is illustrated, wherein the air flows through the interior area 25 of the device 20 and over and through the OPUs 30, as shown via the arrows. In some cases, the air will flow around the OPUs 30, for example, through a space formed between each OPU 30 and an interior wall of the housing 20. In some cases, each OPU 30 is spaced a distance from (e.g., a vertical distance from, in the embodiment shown) the next or nearest OPU 30 forming a space between each OPU 30 within which the air can flow.

In this percolation or permeation cycle, the fans 23, 26 may be turned off and at least one of or both of the inlet 22 and outlet 24 may be closed. However, it is contemplated that operation of one or more of the fans 23, 26 may help facilitate movement of the air throughout the interior area during this cycle. Moreover, the percolation or permeation cycle may last up to six to ten seconds, although other implementations may hold the permeation cycle for five second or less, or more than ten seconds. In any event, during the permeation cycle, the air mixes and flows over and through the OPUs 30 and the corresponding sensors 34a-d while the sensors 34a-d collect sensed data therefrom, or otherwise detect whether certain chemicals are present in the air sample.

At the end of the permeation cycle, the expel or exhaust cycle is initiated, as illustrated in FIG. 8C. During this cycle, the intake fan 23 remains off and, in some cases, the inlet 22 remains closed. However, the exhaust fan(s) 26 is activated or turned on and, in some cases, the exhaust ports or outlet port(s) 24 are opened.

In some embodiments, this causes the air to flow through the openings 35 formed in each of the OPUs 30 or bases thereof passing the air directly over several of the sensors 34a-d disposed around the openings 35. More specifically, in the embodiment illustrated, the OPUs 30 and in particular the openings 35 thereof are axially aligned within the housing 20 collectively forming a channel, as described above. In addition, the exhaust fan 26 may be positioned in such a manner such that the draw of air generated by the fan 26 is focused at the top end of the channel, causing the air to flow up through the channel, through the fan 26 and exit through the outlet port(s) 24.

Figure 9:
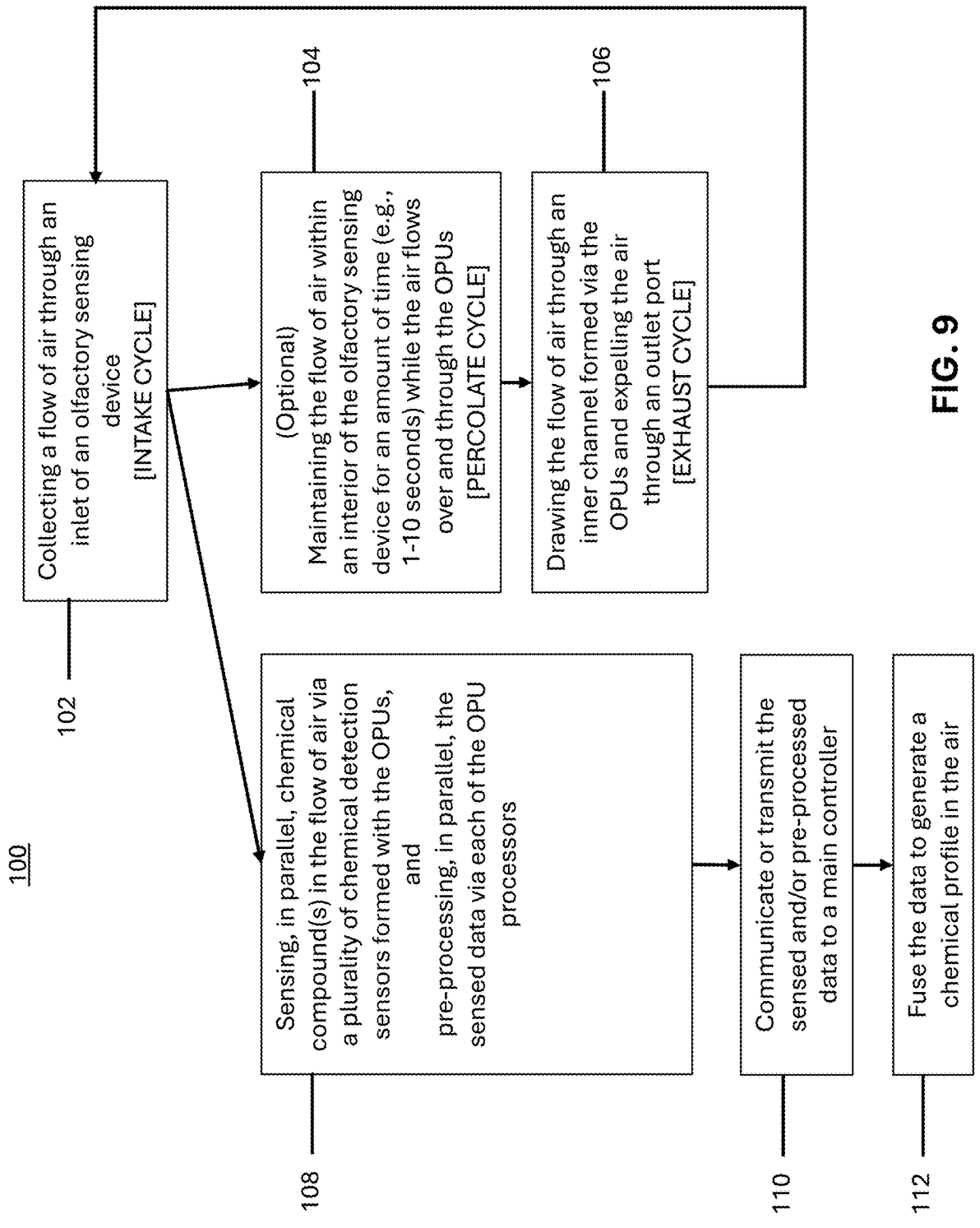
FIG. 9 is a high-level flow chart illustrating the method of detecting an odorant as disclosed in accordance with at least one embodiment of the present invention.
Figure 10B:
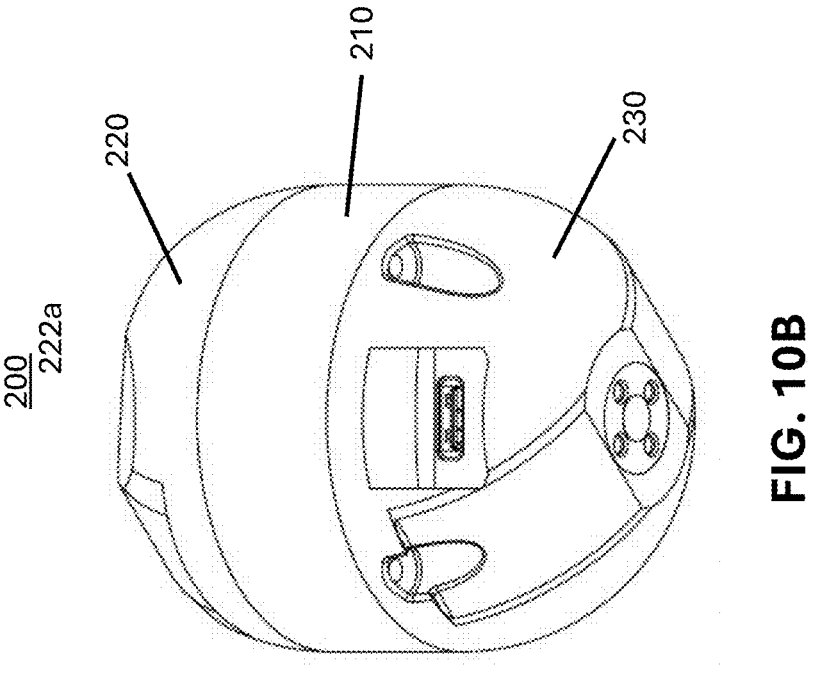
FIG. 10B is a bottom perspective view thereof.
Figure 10A:
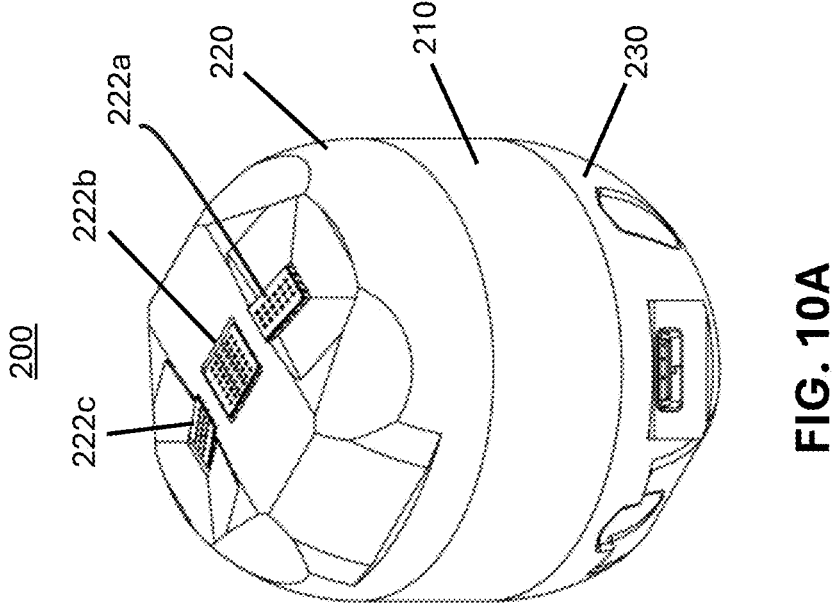
FIG. 10A is a top perspective view of another embodiment of the olfactory sensoring device as disclosed herein.
Figure 10D:
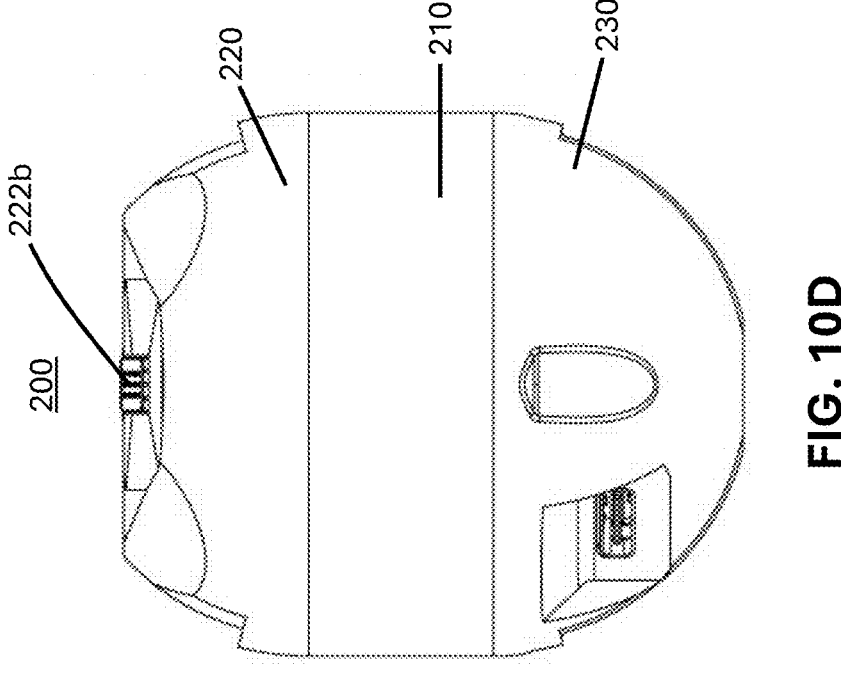
FIG. 10D is a right-side view thereof.
Figure 10C:
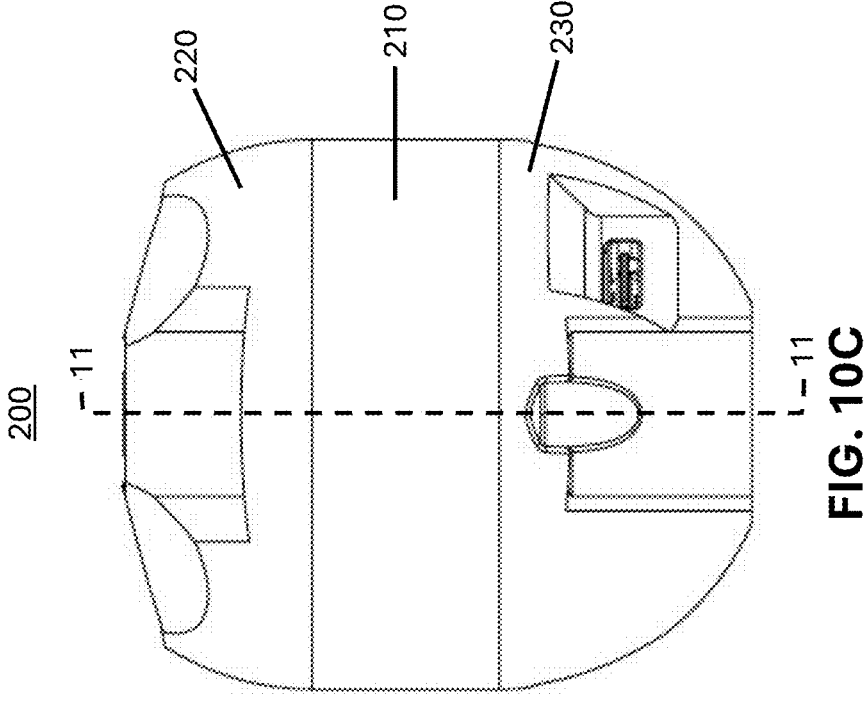
FIG. 10C is a front view thereof.
Figures 10E, 10F:
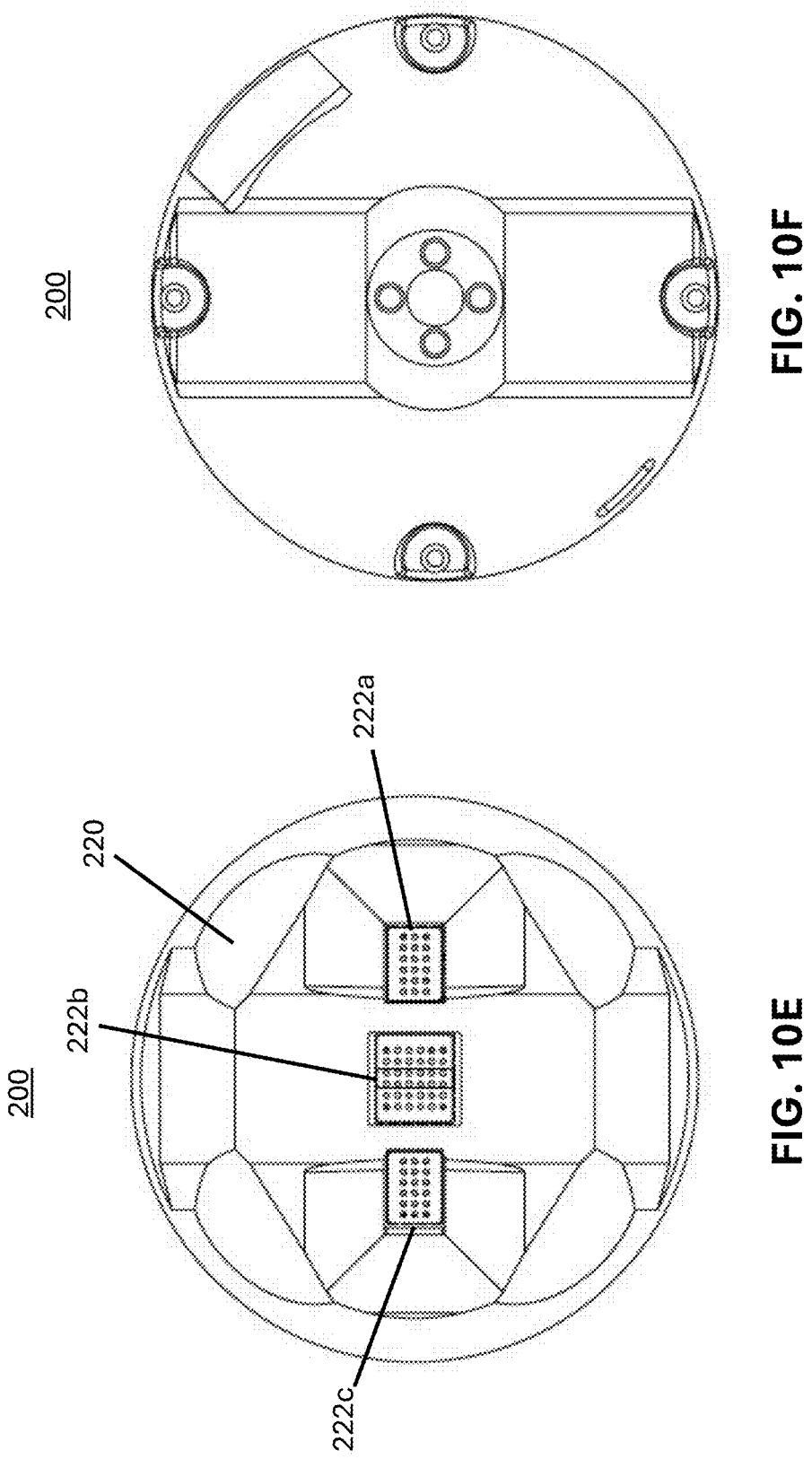
FIG. 10E is a top view thereof.
FIG. 10F is a bottom view thereof.

With reference now to FIG. 9, at least one embodiment of the present invention is directed to a method 100 of sensing an odorant via an olfactory sensing device. In particular, the method 100 of at least one embodiment includes collecting 102 a flow of air through an inlet port of the olfactory sensing device. The olfactory sensing device may be similar to that described in accordance with FIGS. 1-4C and may include, for example, a housing with at least one OPU 30 disposed therein.

As provided above, collecting the flow of air may be accomplished through the use of one or more intake fans, however, other embodiments, in particular more mobile versions of the device may not include intake fans and may instead collect the flow of air through natural movement of the user or device.

Moreover, still referring to FIG. 9, in at least one embodiment, the method 100 further includes an optional step of maintaining 104 the flow of air within the interior region or area of the housing for an amount of time (e.g., between one and ten seconds) to allow the air to flow over the OPU(s) and sensor(s) thereof. This is akin to the percolation cycle described in accordance with FIG. 8B and is optional in that the percolation cycle may not occur in every implementation or every embodiment of the present invention.

Next, the method 100 of at least one embodiment further includes drawing the flow of air through an inner channel formed by one or more axial openings in the OPU(s) and expelling the air out of the housing. This step is akin to the exhaust cycle described in accordance with FIG. 8C.

Still referring to FIG. 9, the method 100 also includes sensing at least one chemical compound in the flow of air and processing the sensed data, as illustrated in block 108. In particular, the at least one chemical compound is sensed via a plurality of chemical detection sensors formed as part of the OPUs. In several embodiments, each OPU includes a dedicated processor allowing the OPUs to sense the chemical compounds and process the sensed data in parallel, as described above. This step, e.g., the sensing and processing step, can occur during the percolation cycle 104 and the exhaust cycle 106, as generally illustrated in the high-level flow chart of FIG. 9.

Once the OPUs have pre-processed the sensed data, the data is then communicated or transmitted to a main controller, as represented at 110, where the data is fused together or combined 112 via the main controller or processor thereof in order to generate a chemical profile in the flow of air. More specifically, based on the sensed data and the chemical(s) determined to be present in the flow of air, the main controller or processor uses several techniques, algorithms and/or processes to fuse the data together and determine a chemical profile.

With reference now to FIGS. 10A-12F, further, perhaps more mobile embodiments of the olfactory sensing device 200, 250 are shown. In at least one of these embodiments, the device 200 includes a main body section 210, a sensor retention section 220, and a bottom base section 230. In some embodiments, one or more location-based or navigation-based devices, such as, but not limited to global positioning system (GPS) devices, are disposed on or in communication with the olfactory sensing device 200 and/or in communication with the processing circuitry thereof. In this manner, the location-based or navigation-based device(s) can be used to facilitate scent-based navigation in order to track or locate the source of a scent or the source of one or more detected chemical compounds in the air.

Moreover, the sensor retention section 220 of at least one embodiment includes one or more sensor outlets or connectors, generally referenced as 222a, 222b, 222c. In this manner, sensors 34 (not shown in FIGS. 10A-10F) can be swapped out for other sensors depending on, for example, the particular chemical(s) the user is desiring to locate or detect. In other words, various chemical or electrochemical sensors 34 can be connected to the device 10 via the one or more sensor connectors 222a, 222b, 222c.

In some embodiments, the entire sensor retention section 220 can be removed from the main body section 210 and replaced with a different sensor retention section. The replacement sensor retention section may include a different structure, configuration, shape, etc. and may include more or fewer outlets 222a, 222b, 222c. This allows for quick customization and interchangeability of the sensor retention section 220 from the main body section 210.

Figure 11:
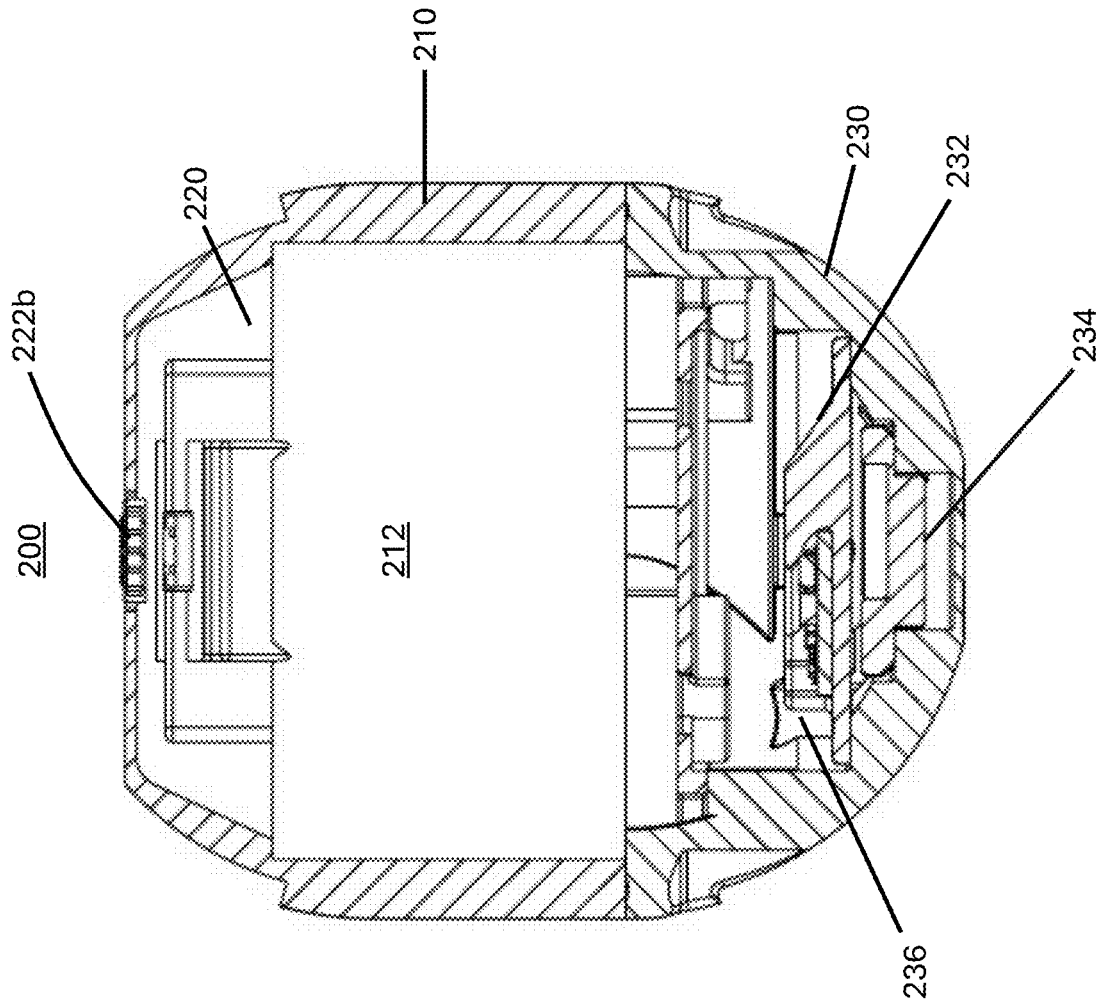
FIG. 11 is a cross-sectional view along line 11-11 of the olfactory sensoring device illustrated in FIG. 10C.
Figure 12E:
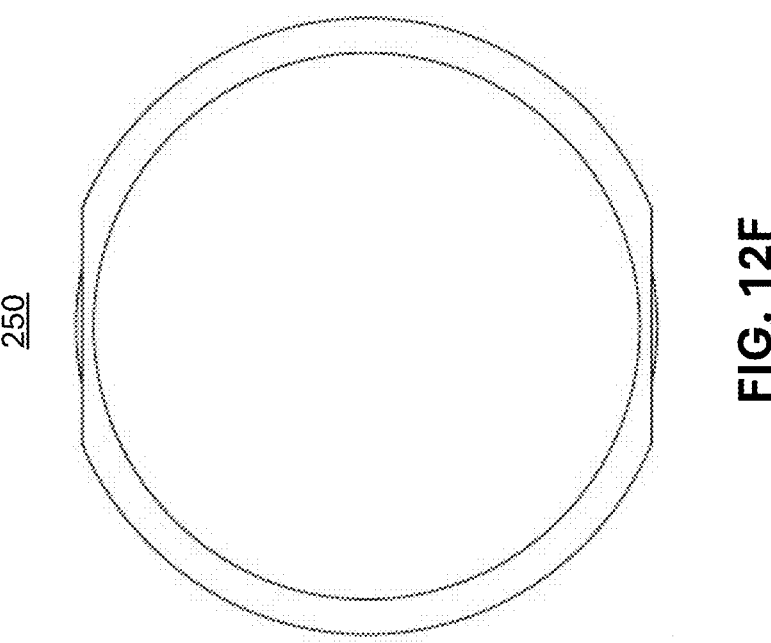
FIG. 12E is a top view thereof.
Figure 12F:
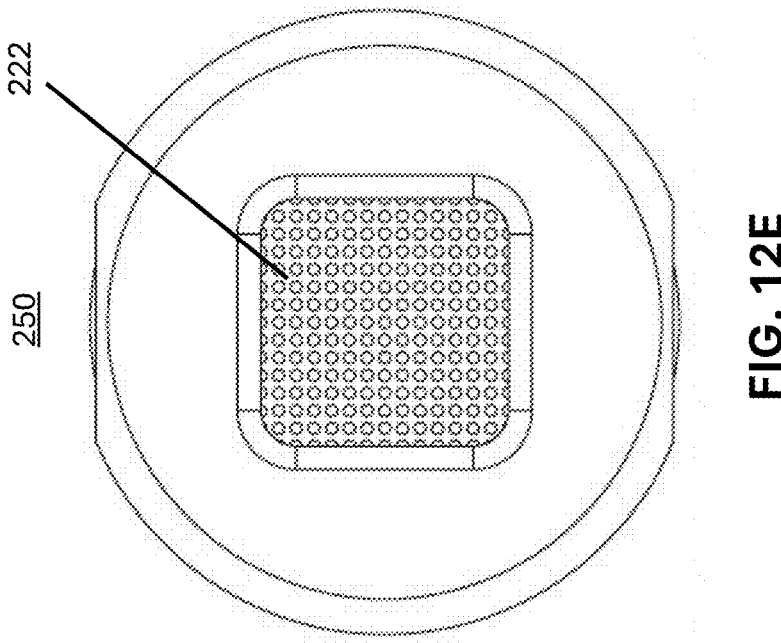
FIG. 12F is a bottom view thereof.

With reference now to the cut-away view of FIG. 11, the main body section 210 of at least one embodiment includes an interior area for housing the OPU circuitry, motherboard, additional sensors, wiring etc., as generally referenced as

212. Again, in at least one embodiment, the upper section 220 which includes outlets 222a-c allows for customization of the device 200 by selecting or swapping out different sections 220 or by using different sensors.

Furthermore, the bottom or base section 230 of at least one embodiment includes components for providing power to the device 10, for example via one or more batteries. As an example, and as illustrated in cut-away view of FIG. 11, the base section 230 of at least one embodiment can include charging circuitry 232, an inductive charging base 234 and a battery and corresponding circuitry 236. Other embodiments may include different charging or battery components, such as replaceable batteries, power inlets for wired connection to an external power source, etc.

FIGS. 12A-12F illustrates another embodiment of the device 250 that includes at least one sensor outlet or connector 222, to which a chemical sensor, electrochemical sensor or other sensor can connect and interface with the device 250. One or more exhaust ports or venting holes 24 are provided, while processing circuitry (not shown) is disposed inside the housing.

In this embodiment, port 256 is provided in order for the device to interface with an external power source, for example, via a cable such as but in no way limited to a USB-C cable.

In the embodiments illustrated in FIGS. 10A-12F, the device 200, 250 may connect to a mobile device via a wireless network, such as through Bluetooth or WI-FI. In some cases, the device firmware can only be updated over-the-air via the mobile device and/or a corresponding application executing thereon. For example, the application on the mobile device can fetch new firmware or firmware updates automatically and can transmit the firmware or updates to the device 200, 250 when available. In some cases, particularly with regard to the embodiment illustrated in FIGS. 10A-12F, the firmware cannot be updated through the USB-C (or other externally accessible) port in order to prevent or restrict someone from trying to extract the code off of the device from the port.

Furthermore, it should also be noted that several embodiments of the present invention, including but not limited to the embodiments illustrated in FIGS. 10A-12F, may be used to facilitate scent-based navigation. For example, one device 10, 200, 250 can be used to help guide a drone 60, robot 62 or human to the source of the scent, particularly if the device 10, 200, 250 is in motion, for example, by being attached to a moving robot, drone, human or object. Multiple devices 10, 200, 250 can be used to triangulate the source of the scent or odor by using a swarming technique and communication with one another. For example, if there is a device 10, 200, 250 in two or more corners or other locations of a room and a person with a rifle walks in, the devices 10, 200, 250 would be able to triangulate that person as he/she walks by and as the devices 10, 200, 250 detect the sulfur-dioxide and carbon emitted from the gun powder.

Furthermore, in several embodiments of the present invention, the devices 10, 200, 250 can be implemented with an API that allows easy communication to third-party sensors or devices (e.g., cameras, lidar, radar) to encourage adoption of the sensors onto various platforms.

Figure 13:
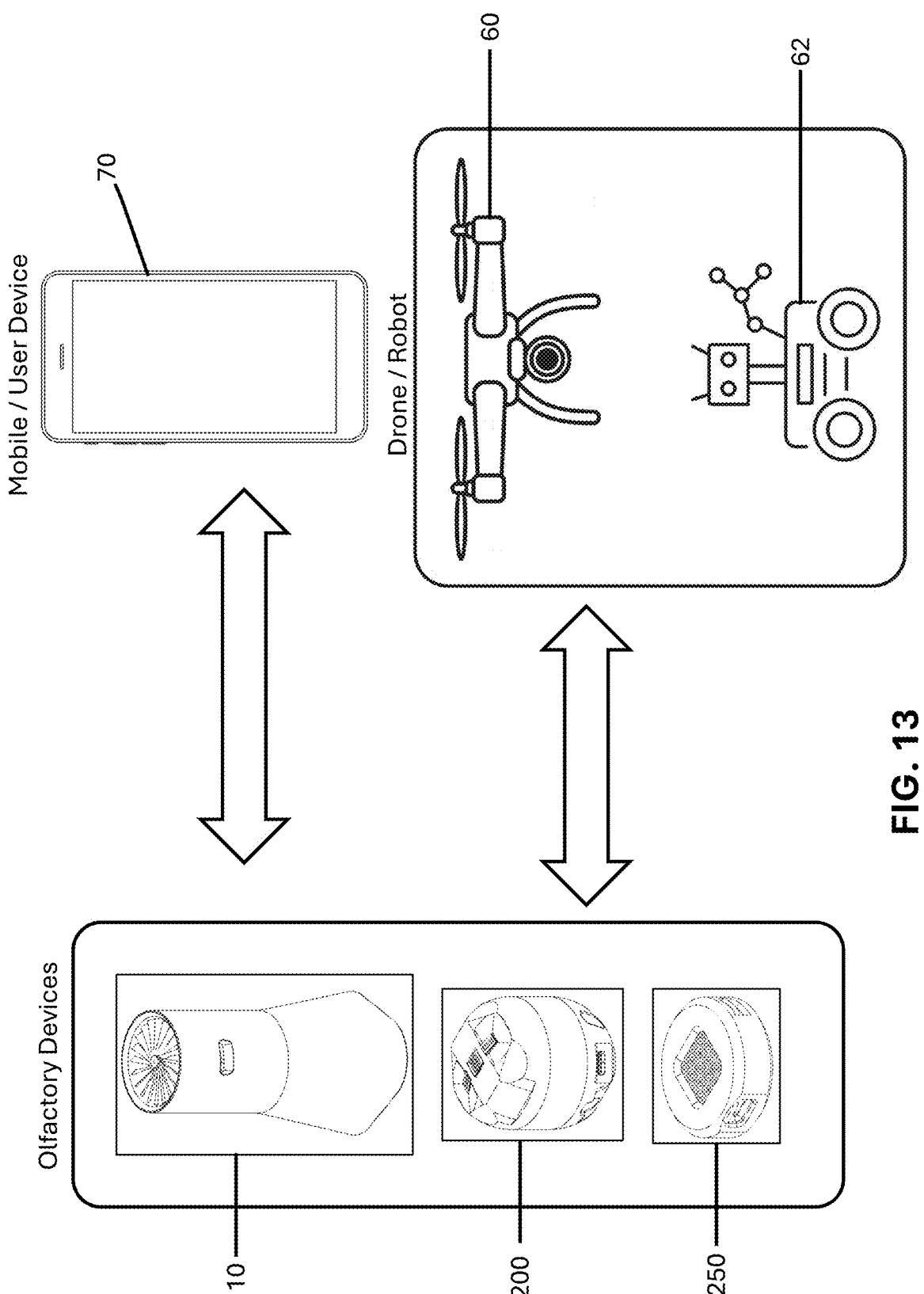
FIG. 13 is a block diagram illustrating an olfactory sensoring system as disclosed in accordance with at least one embodiment of the present invention.

As an example, as shown in the block diagram of FIG. 13, one or more olfactory sensing devices 10, 200, 250 of the present invention can connect to a mobile device 70 (e.g., via Bluetooth, WI-FI, or other wireless connection) such that the olfactory device 10, 200, 250 begins to stream the observed olfactory data to the mobile device 70 or application 75 thereof.

Figure 14A:
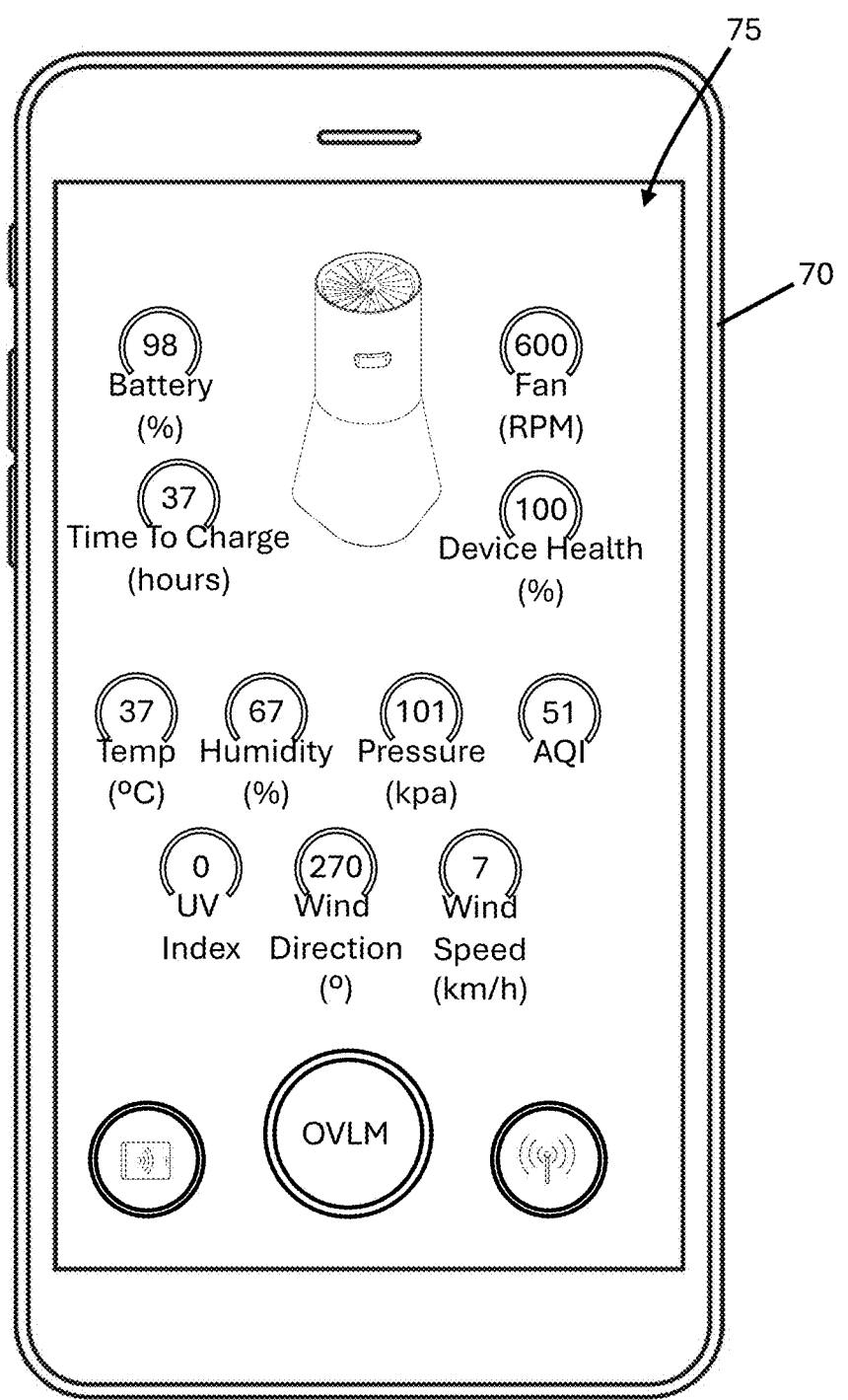
FIG. 14A is an exemplary screenshot of a mobile application showing a status module as disclosed in accordance with at least one embodiment of the present invention.
Figure 14B:
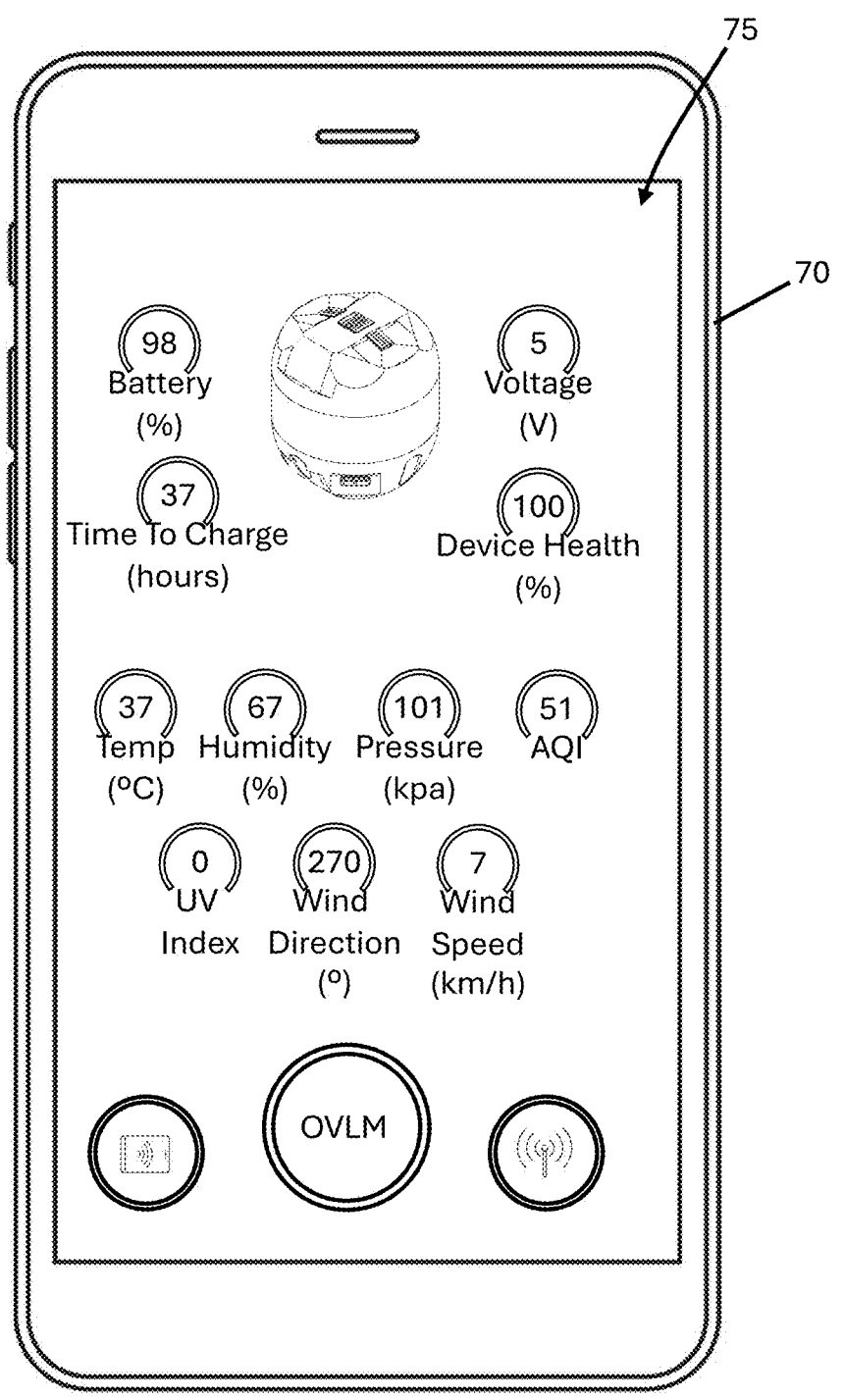
FIG. 14B is an exemplary screenshot of a mobile application showing a status module as disclosed in accordance with another embodiment of the present invention.

FIGS. 14A-G illustrate some exemplary screenshots of the mobile application 75 as disclosed in accordance with at least one embodiment that is accessible on or executed by the mobile device 70. More specifically, FIGS. 14A and 14B illustrate a home screen or status module that indicates one or more detected or measured components associated with the olfactory device 10, 200, respectively. For example, the status indicators provided on the mobile application 70 may provide information relative to the device 10 itself, such as the current battery level, the estimated or calculated time left until the battery needs to be charged again, the fan speed, the overall device health, etc. Other status indicators provided in the mobile application can include information related to the environment, for example, the environment surrounding the connected or corresponding olfactory device 10, 200, such as, but not limited to, the ambient temperature, humidity, pressure, air quality index (AQI), UV index, wind direction, and wind speed, etc.

Figure 14C:
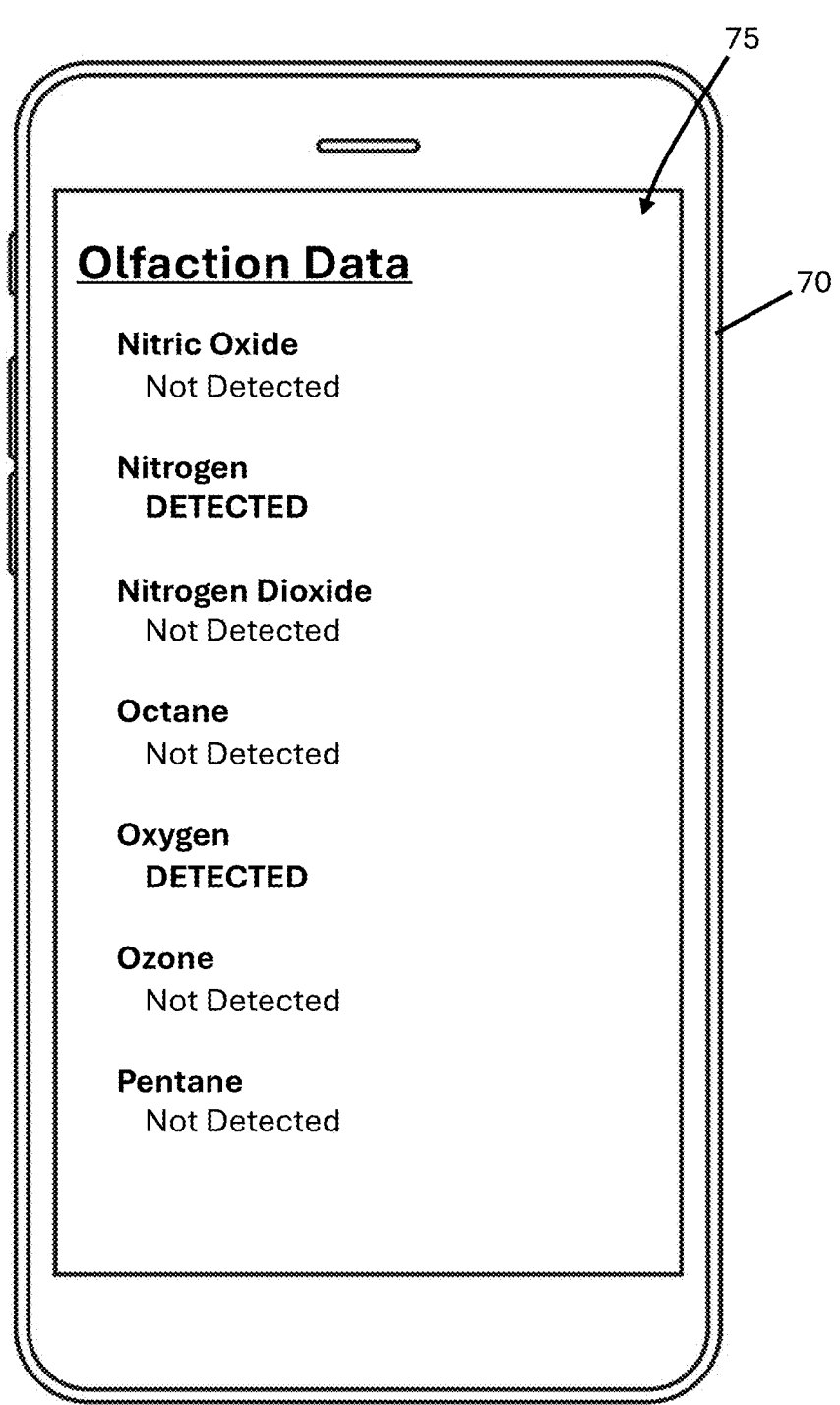
FIG. 14C is an exemplary screenshot of a mobile application showing a plurality of olfaction data collected using an olfactory sensory device as disclosed in accordance with at least one embodiment of the present invention.
Figure 14D:
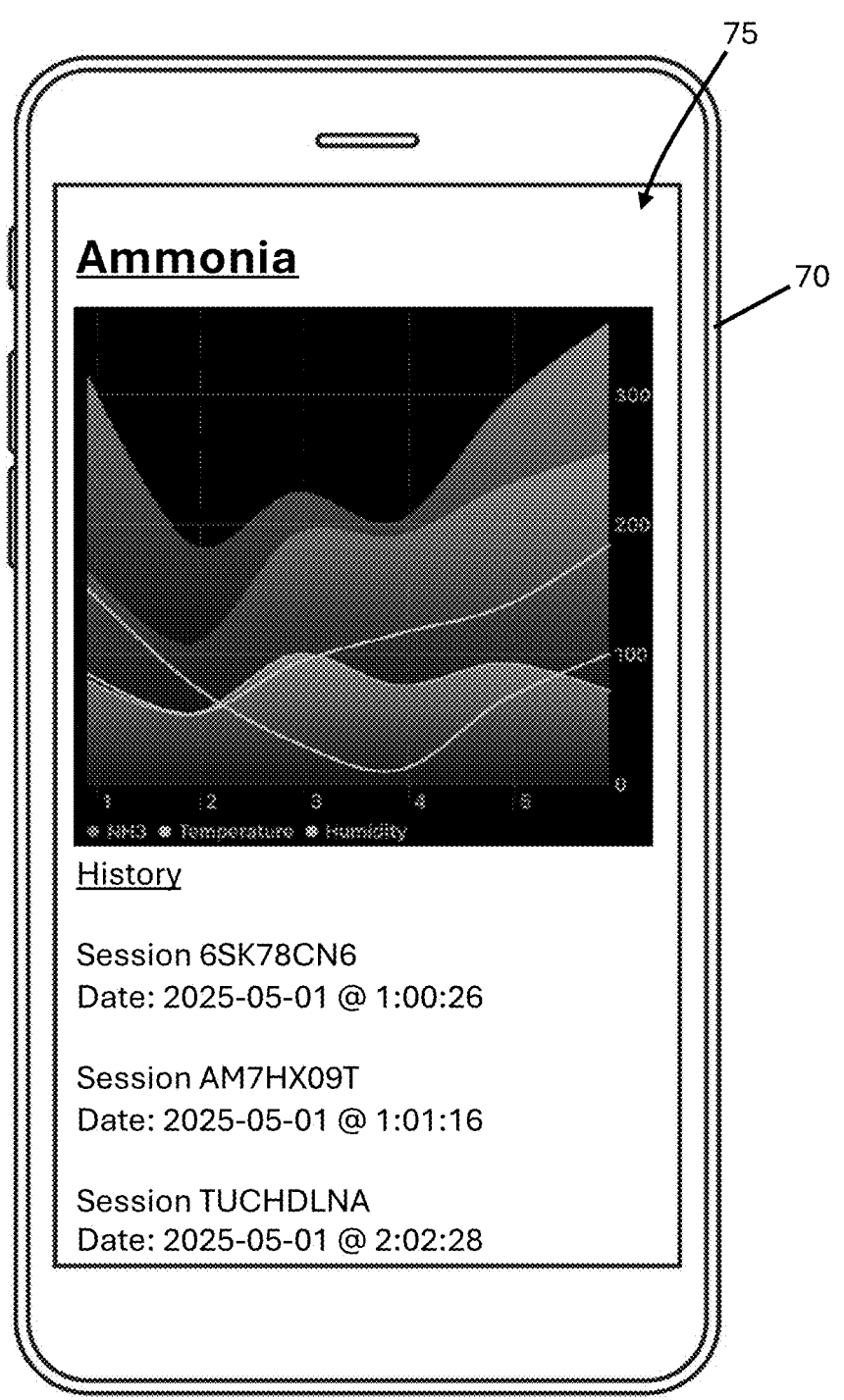
FIG. 14D is an exemplary screenshot of a mobile application showing a graph of olfaction data collected using an olfactory sensory device as disclosed in accordance with at least one embodiment of the present invention.
Figure 14E:
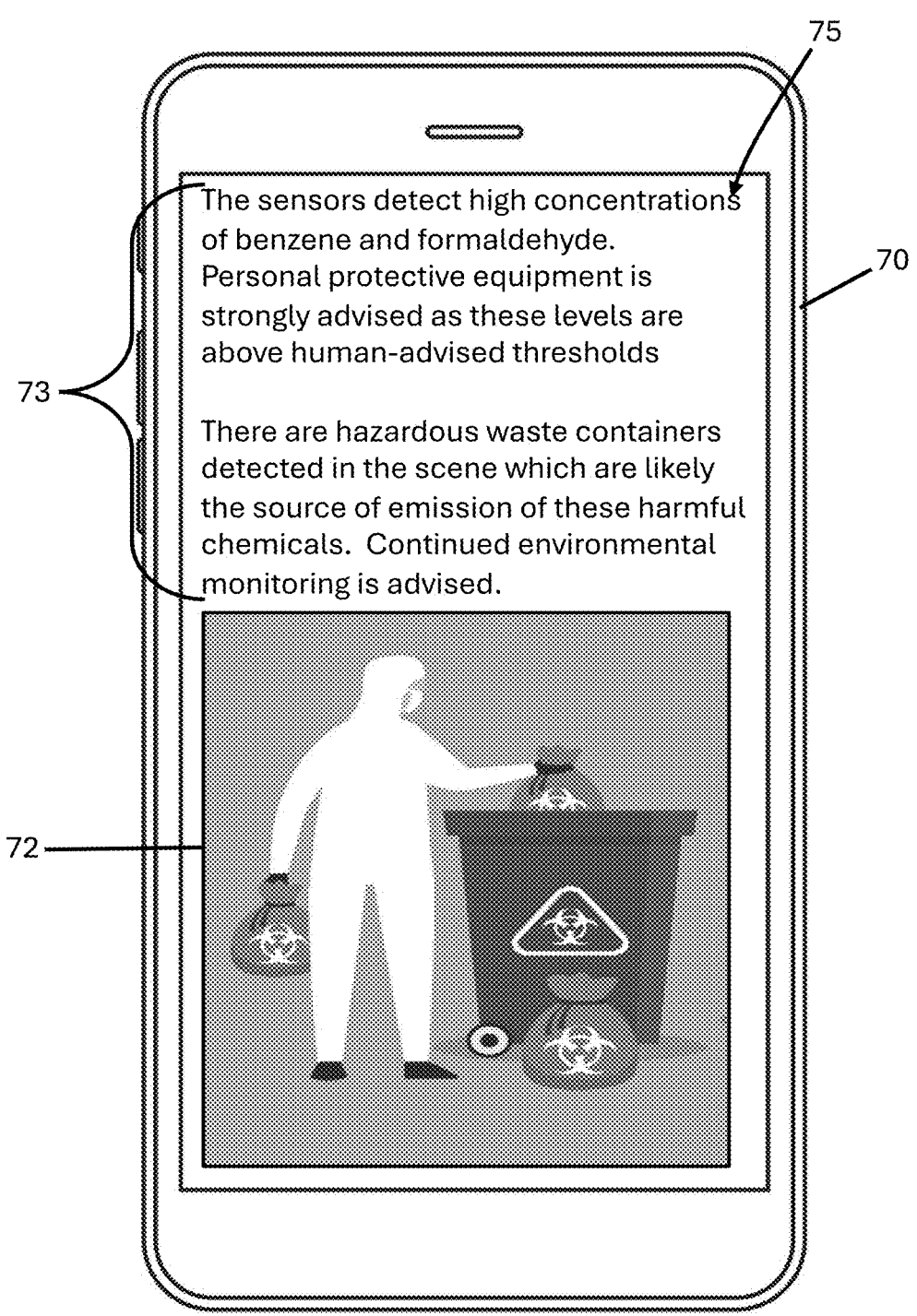
FIG. 14E is an exemplary screenshot of a mobile application showing a recommendation message generated based upon an identified scene captured via the mobile device as disclosed in accordance with at least one embodiment of the present invention.
Figure 14F:
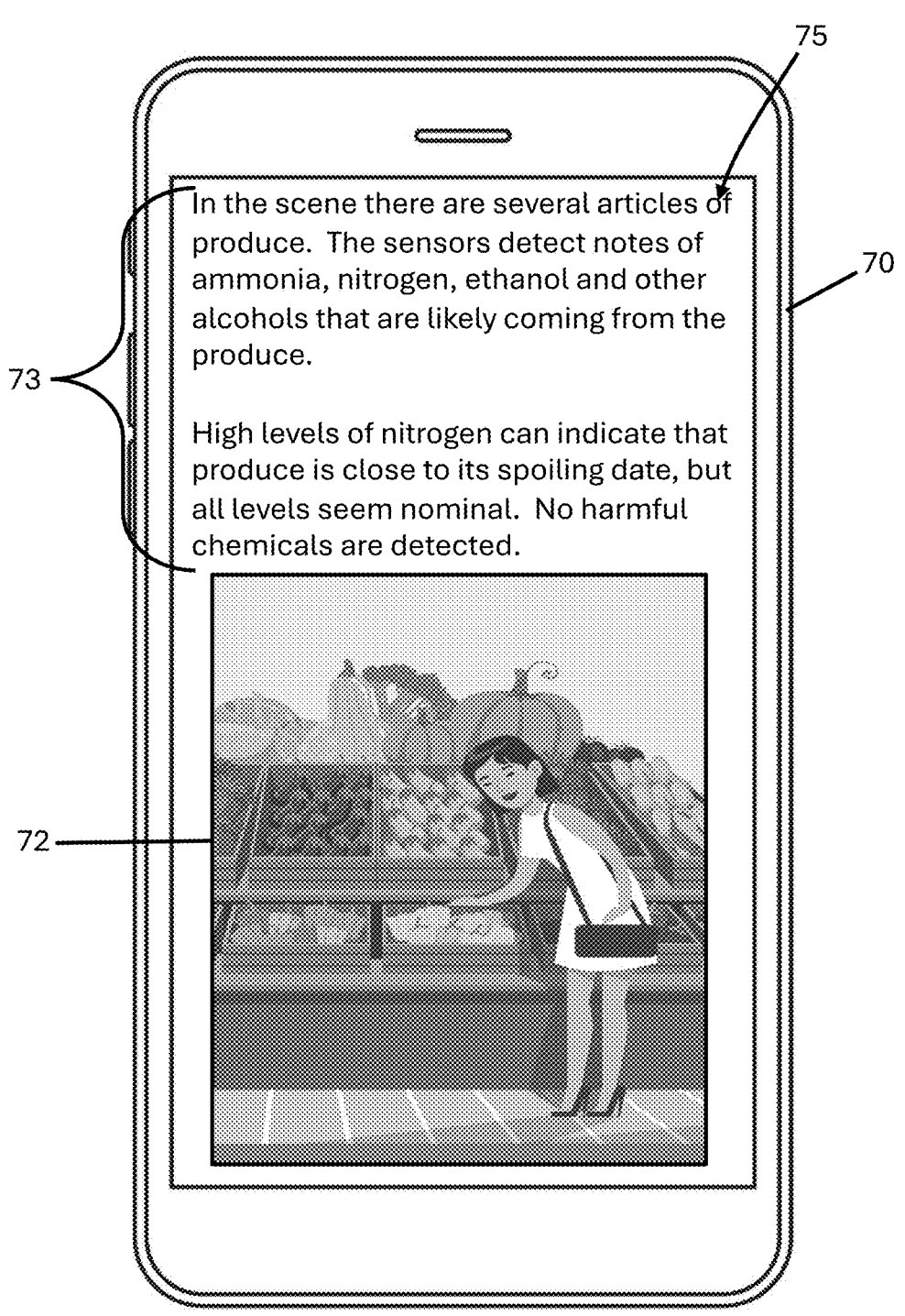
FIG. 14F is an exemplary screenshot of a mobile application showing another recommendation message generated based upon an identified scene captured via the mobile device as disclosed in accordance with at least one embodiment of the present invention.

FIG. 14C is an exemplary screenshot showing sensed data and/or processed data from the olfactory device 10, 200 indicating whether certain chemical components or compounds, for example, but not limited to, nitric oxide, nitrogen, nitrogen dioxide, octane, oxygen, ozone, pentane, etc., are detected in the air via the device 10, 200. Of course, other chemicals or chemical compounds may be included and other modules for reporting that information are contemplated within the full spirit and scope of the present invention. For example, FIG. 14D illustrates an exemplary report or graph illustrating historical data collected by the device 10, 200 relative to a chemical compound or component, in this case, ammonia.

In addition, the mobile device 70 and mobile application 75 of at least one embodiment can be used or operable to detect items nearby or in a scene captured by a camera integral with (e.g., as part of the mobile device) or communicative with (e.g., external to) the mobile device. Specifically, as illustrated for example in FIGS. 14E and 14F, in at least one embodiment, the camera on the mobile device 70 can then be activated (e.g., via an option in the application or via the native options on the mobile device). When the camera of the mobile device 70 is activated, a machine learning model begins identifying objects in the room or in the scene. The same or a different machine learning model can be used to map the olfactory data to probable objects in the scene (e.g., if a vehicle is identified by the camera and carbon monoxide is detected by the device 10, 200, 250, the machine learning model can associate the vehicle with the carbon monoxide.) Then, the application can instruct the user how to navigate toward (or away from) the objects emitting the observed compounds in the scene.

For instance, as an example, if the system, mobile application or method of at least one embodiment identifies certain items, e.g., hazardous waste containers, in a scene 72 captured by the camera, the chemical(s) detected in the air via the olfactory device 10, 200 can be combined with the visual data obtained by the camera to provide or generate a recommendation, warning or other informative message 73 to the user of the mobile device 70.

Figure 14G:
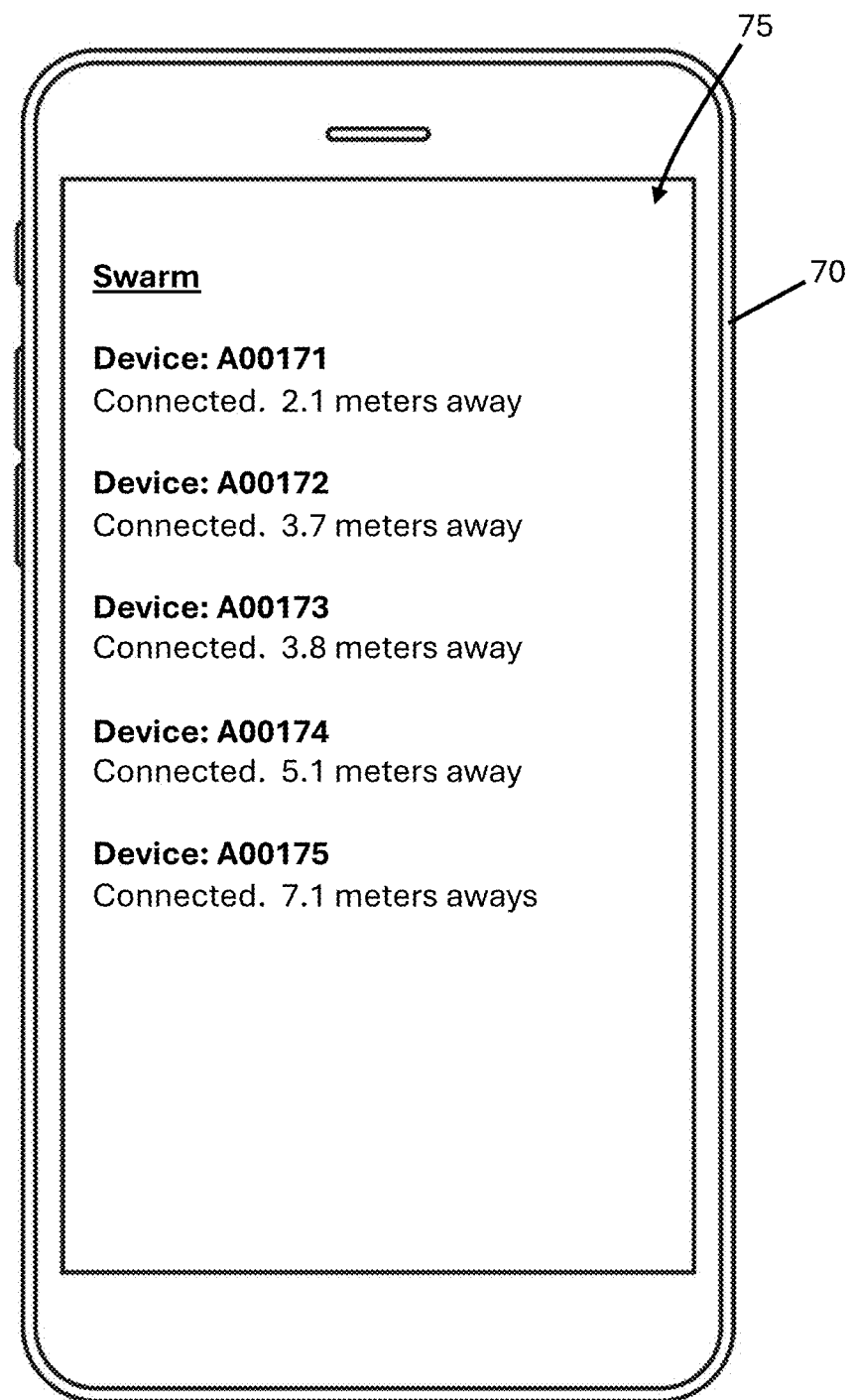
FIG. 14G is an exemplary screenshot of a mobile application showing a swarm of a plurality of olfactory sensory devices in direct or indirect communication with one another as disclosed in accordance with at least one embodiment of the present invention.

FIG. 14G illustrates an example of a swam where a plurality of devices 10, 200, 250 can be used to triangulate the source of the scent or odor by using a swarming technique and communication with one another. In the example shown, five devices are near one another and can communicate with one another to detect the location of a source of the chemical(s) or other information.

In some cases, if the device 10, 200, 250 is paired to a robot or drone, for example, then the device 10, 200, 250 would provide the output commands to the robot or drone (e.g., bank left 30 degrees to fly toward the source of the smoke). A microphone can also be used to further contextualize from where a scent may be coming.

Figure 15:
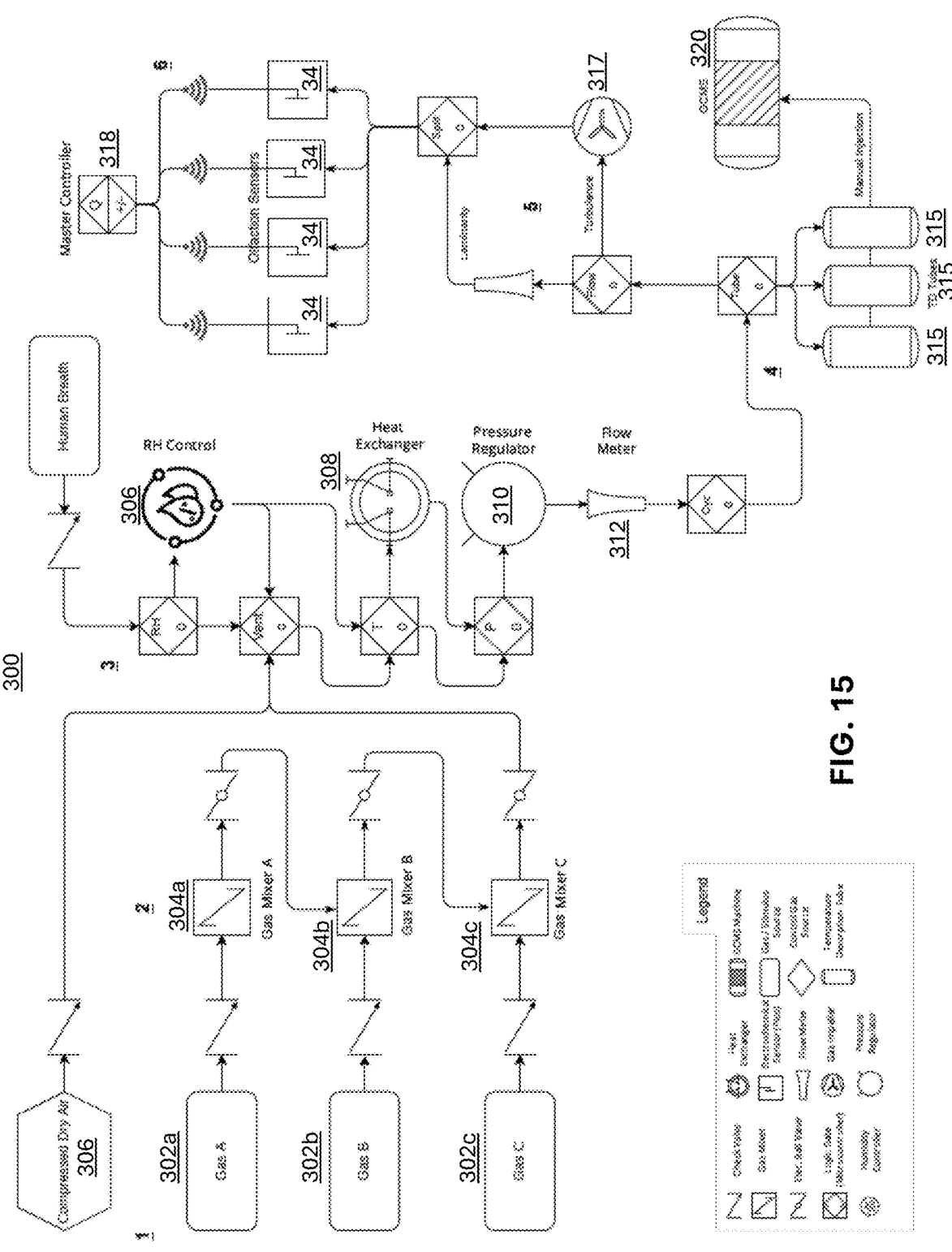
FIG. 15 is a system block diagram of an autonomous multimodal simulator as disclosed in accordance with at least one embodiment of the present invention.

With reference now to FIG. 15, in at least one embodiment, an autonomous multimodal simulator (sometimes referred to as an "AMS") 300 is provided, which is an electromechanical apparatus designed to rapidly characterize chemical data over the various sensors 34 used in connection with the various devices 10, 200, 300 described herein. In at least one embodiment, the AMS is run through one or more scripts that tell it how to run different actuators and stages within the apparatus. There are small monitoring sensors placed at each functional spot on the GCMS machine to ensure they can be controlled and monitored by software.

In particular, gases are mounted into the apparatus, as represented at 302a-c. It should be noted that while FIG. 11 shows three gases at Section (1) (Gas A (302a), Gas B (302b), Gas C (302c)), there could be any number of gases so long as the plumbing was there to support. From here, each gas has the option to go through the "Gas Mixer" at Section (2) 304a-c. Sometimes, we want to ensure we can still detect one gas when it is mixed/masked by another, so these mixers help train the selectivity of the devices 10, 200, 250. Gases are pushed through the AMS apparatus either via compressed dry air 306 or through a fan that pushes/pulls the gases through the tubing.

After optional mixing, the gases move to the "conditioning" phase at Section (3). The intent of this stage is to moderate different temperatures, pressures, and humidities to obtain a large distribution of how the sensor signal changes as environmental conditions change. For all olfactory sensors 34, their response varies depending on the surrounding temperature, pressure, and humidity. We can humidify the gas mixture 306 to increase its humidity level, heat/cool it through the heat exchanger 308, and adjust the pressure through the pressure regulator 310. These adjustments are all handled through software commands from the AMS controller. A flow meter 312 is placed after the pressure regulator 310 to ensure the gas mixture is indeed flowing at the programmed pressure. Note that there is an option at the top here for human breath to be evaluated. One application of the sensors 34 is breath analysis within medical settings, so this appendage to the AMS allows us to monitor an exhaled sample of human breath and analyze it for target compounds.

Next, at Section (4) the gases are now "conditioned", and we can fork one sample of these gases to the GCMS machine 320. Many GCMS machines 320 require the use of thermal desorption tubes 315, which are small pieces of hardware that enable faster automation of the gas extraction and injection into the GCMS machine 320. In some cases, however, it is contemplated that the desorption tubes 315 may not be needed or used. Additionally, sometimes, the GMCS stage may be bypassed, for example, if the operator is running simple sensor calibrations on compounds for which there is a lot of GCMS data already. However, for new compounds, the samples are benchmarked against the GCMS to measure how well the sensors 34 are holding up against the GCMS machine 320.

After forking the gas mixture to the GCMS machine 320, the remaining gas mixture flows to the devices 10, 200, 250 and/or to the sensors 34. Turbulence can influence the way the sensors 34 respond, so in some cases, in Section (5), a turbulence option 317 is added to agitate the air flow and make it more turbulent. If the software script does not define that turbulence should occur, this step is bypassed.

Next, the final gas mixture is flowed over the devices 10, 200, 250 and/or sensors 34 at Section (6). In FIG. 11, there are four olfaction sensors 34 shown, however, there could be any number, greater or fewer than four, of sensors 34 if the infrastructure is available. Furthermore, in FIG. 11, there is a WIFI signal routed to each olfaction sensor 34 to indicate a wireless transmission of data, however, the data can be transmitted via wired or other methods since the devices 10, 200, 250 of the various embodiments can support BLE, WIFI, and USB communication.

It should also be noted that the devices 10, 200, 250 of the various embodiments described herein may use different olfaction sensors 34 depending on the target compound and application, so the sensors 34 in the AMS could be any type of olfaction sensor that lies within the devices 10, 200, 205, including, but in no way limited to photo ionization sensors, metal oxide sensors, spectrometry/spectroscopy sensors, chromatography sensors, electrochemical sensors, Mach-Zehnder interferometer sensors, photo acoustic sensors, gravimetric sensors, oscillating crystal sensors, quantum vibration sensors, non-dispersive infrared sensors, or any other type of olfaction sensor. In some layouts of section (6), each olfaction sensor 34 is configured in the exact same manner to evaluate a regression over a gas mixture. In other layouts, each olfaction sensor 34 may be configured slightly different to assess, for example, different real-time machine learning or signal processing algorithms. The "Master Controller" moderates the configuration of each olfaction sensor and moderates the data streaming of each sensor's final data to the cloud. It then performs a "health check" on each sensor to make sure it is reset properly for the next gas mixture.

Then, the data from the olfaction sensors 34 are analyzed and compared to the GCMS machine 320 results. If there are discrepancies here, the operator may find that the GCMS technology is more sensitive over the tested compounds than sensors 34; or the operator may find out that the sensors 34 are better assessors of the target compounds than the GCMS machine 320. If a discrepancy in measurement occurs, the operator can re-run another set of identical tests. If these tests are also discrepant, the operator can perform an analytical deep dive into the chemistry to ensure that the discrepancy is due to the technology differences and not due to, for example, a malfunctioning piece of the GCMS machine or the sensors 34.

As provided herein, the AMS 300 of at least one embodiment is run by a script to determine how and when each valve opens on the AMS, which gases are mixed, how air is conditioned, and how many tests to run. An example script is below:

AMS ON//turn the AMS on
N 100//run 100 tests with this gas mixture
TIME NOW//start immediately (can optionally set to run at a specific date and time)
HEALTH_CHECK TRUE//check to make sure all valves are responsive, electrical current is flowing to all sensors, and loaded config is valid
SEQ START beginning the AMS sequence
PURGE CDA//purge the whole AMS with the compressed dry air (CDA) line
GAS_A 1000//milliseconds to open the valve for gas A
GAS_B 400//milliseconds to open the valve for gas B
MIX A B//mix gases A and B
WAIT 30//wait 30 seconds for gases to equalize after mixture BREATH FALSE//no human breath analysis, keep this valve shut
RH 10-90 5//analyze humidity levels of 10-90% and step each test by 5%
TEMP 30-50 5//analyze temperature levels 30-50° C., and step each test by 5° C.
PRESSURE 100-103 1//analyze pressure levels of 100-103 kPa and step each test by 1 kPa %
TOL 1//acceptable tolerance levels on RH, TEMP, and PRESSURE conditioning are 1% of the levels specified, else fail the test and restart
GCMS TRUE//fork the conditioned air into the GCMS line to prepare a sample for GCMS analysis at section (4)
TURBULENCE FALSE//do not induce turbulence at section (5)
N_OLF_DEVICES 4//number of olfaction devices being tested
OLF_DEVICE_A_CONFIG 1//olfaction device A has configuration 1, this is loaded from cloud
OLF_DEVICE_B_CONFIG 1//olfaction device B has configuration 1, this is loaded from cloud
OLF_DEVICE_C_CONFIG 2//olfaction device C has configuration 2, this is loaded from cloud
OLF_DEVICE_D_CONFIG 2//olfaction device D has configuration 2, this is loaded from cloud
ALL_SAVE TRUE//save all data to the cloud
WAIT 90//wait 90 seconds before you begin the next test
SEQ END//after all 100 tests are complete, the sequence is done
PURGE CDA//purge the whole AMS with the compressed dry air (CDA) line one last time
ALL_VALVES FALSE//close all valves on the AMS
TEST_REPORT TRUE//send a summary of the test results
AMS OFF//shut the whole AMS down In some embodiments, the "Master Controller" 318 at Section (6) monitors a spot on a connected database. When a new script is pushed to that database, the Master Controller downloads the script and begins running it at the specified time. So, the operator can indicate that he/she wants 1000 (or any number) of tests to run over night and the AMS will do it all without the operator having to manually sit there and open valves, which is great.

Furthermore, it should also be noted that the sensors 34, as used in connection with several embodiments of the present invention, are analyzing air for target molecules that have potential energy stored inside. This potential energy could be in the form of electrons, ions, or entire atoms, like an oxygen atom. When the target molecule touches the surface of the sensor 34, whether it is an electrochemical, metal oxide, optical, acoustic, or some other type of sensor, a reaction occurs with an energy exchange taking place. The signature of this energy gives an indication of what molecule is being detected, or what the sensors are "sniffing" in the air. As this energy exchange takes place, it usually results in some sort of electrical charge back to a processor indicating a disturbance in resistance (metal oxide sensors), amperage (electrochemical sensors) or voltage (optical sensors) has occurred.

The sensors 34 are simply measuring the magnitude of this charge and mapping back to a known pattern of thresholds that determine which chemical compound is present in the air. However, this charge can be stored for later use, effectively enabling the sensors 34 to act as a power generation mechanism. This allows the sensors 34 to passively monitor the air and generate charge according to specific compounds present in the environment.

Accordingly, in some embodiments, the sensors 34 may be attached to a battery, capacitor, or some other power bank to store power for later use. The sensor 34 requires no other hardware changes other than this power bank at which to route the charge. The charges generated from the chemical interactions are not large—they are on the order of nano-amperes. Therefore, the list of items that can be charged with the sensors 34 is small: for example, small IoT devices, wearable tech, small robots, small UAVs, personal in-body medical instruments, or small capacitors on a larger com-puter. In many cases, the sensors 34 would act as an auxiliary power supply to a much larger power mechanism. Notably, since the sensors 34 are tuned to detect only specific compounds, only those compounds are those that will be able to generate charge back to the power supply.

Since other modifications and changes varied to fit par-ticular operating requirements and environments will be apparent to those skilled in the art, the invention is not considered limited to the example chosen for purposes of disclosure, and covers all changes and modifications which do not constitute departures from the true spirit and scope of this invention. This written description provides an illustra-tive explanation and/or account of the present invention. It may be possible to deliver equivalent benefits using varia-tions of the specific embodiments, without departing from the inventive concept. This description and these drawings, therefore, are to be regarded as illustrative and not restric-tive.

The invention claimed is:

1. An olfactory sensing device, comprising:

a housing defining an interior area, at least one olfactory processing unit disposed within said interior area of said housing, said at least one olfactory processing unit comprising:

at least one base, a plurality of chemical detection sensors disposed on said at least one base, each of said plurality of chemical detection sensors being configured to detect at least one chemical compound, at least one potentiostat configured to sense an electro-chemical response of an odorant in the flow of air, and at least one processor, an inlet formed on said housing to facilitate a flow of air into said interior area of said housing, an outlet formed on said housing to facilitate the flow of air out of said interior of said housing, wherein said at least one base of said at least one olfactory processing unit comprises a centrally-disposed opening through which the flow of air flows during operation of said olfactory sensing device said plurality of chemical detection sensors being disposed around said centrally-disposed opening and in communication with the flow of air, wherein said inlet and said outlet are both disposed on a same side of said at least one olfactory processing unit such that the flow of air enters said interior of said housing through said inlet, flows around an outer edge of said at least one olfactory processing unit through a space formed between said outer edge of said at least one olfactory processing unit and said housing until the flow of air is drawn through said centrally-disposed opening formed through said at least one base and expelled through said outlet, and a main controller communicative with said at least one olfactory processing unit, said main controller com-prising a processor configured to combine sensor data from said plurality of chemical detection sensors to generate a chemical profile in the flow of air.

2. The olfactory sensing device as recited in claim 1 wherein each of said plurality of chemical detection sensors are configured to detect one specified chemical compound or one specified group of compounds.

3. The olfactory sensing device as recited in claim 1 further comprising a plurality of olfactory processing units, each of said plurality of olfactory processing units compris-ing at least one base with an opening formed there through, a plurality of chemical detection sensors disposed on said at least one base, at least one potentiostat, and at least one processor.

4. The olfactory sensing device as recited in claim 3 wherein said openings of each of said plurality of olfactory processing units are axially aligned with one another within said interior area of said housing forming an inner channel disposed through said plurality of olfactory processing units.

5. The olfactory sensing device as recited in claim 4 wherein each of said plurality of olfactory processing units comprise a plurality of bases axially stacked upon one another, wherein each of said plurality of bases comprise an opening therethrough.

6. The olfactory sensing device as recited in claim 4 wherein said at least one processor of each of said plurality of olfactory processing units operate to facilitate parallel processing with other ones of said plurality of olfactory processing units.

7. The olfactory sensing device as recited in claim 4 wherein said plurality of olfactory processing units and said main controller are communicatively arranged to form a physical artificial neural network.

8. The olfactory sensing device as recited in claim 1 further comprising an inlet fan disposed proximate said inlet port and configured to draw the flow of air into said interior area of said housing.

9. The olfactory sensing device as recited in claim 8 further comprising an exhaust fan disposed proximate said exhaust port and configured to expel the flow of air through said exhaust port and out of said housing.

10. An olfactory sensing device, comprising:

a housing defining an interior area, a plurality of olfactory processing units disposed within said interior area of said housing, each of said plurality of olfactory processing units comprising:

a first side and a second side, said second side being opposite said first side, a plurality of bases, each comprising an opening formed there through, at least one connector assembly formed between adja-cent ones of said plurality of bases, wherein said connector assembly comprises cooperative data transmission connectors allowing selective addition of another base to and removal of at least one of said plurality of bases from a corresponding one of said plurality of olfactory processing units, a plurality of chemical detection sensors disposed on at least one of said plurality of base, each of said plurality of chemical detection sensors being config-ured to detect at least one chemical compound, at least one potentiostat configured to sense an electro-chemical response of an odorant in the flow of air, and at least one processor, an inlet port and an exhaust port disposed on said housing on a said first side of each of said plurality of olfactory processing units, said inlet port being configured to facilitate a flow of air into said interior area of said housing, said outlet port being configured to facilitate the flow of air out of said interior area of said housing, wherein the flow of air enters said interior area of said housing through said inlet port on said first side of each of said plurality of olfactory processing units, flows around an outer edge of at least one of said plurality of olfactory processing units through a space formed between said outer edge and said housing to said second side of said at least one of said plurality of olfactory processing units until the flow of air is drawn through said opening formed through each of said bases and expelled through said outlet, and a main controller communicative with each of said plurality of olfactory processing units, and wherein said plurality of olfactory processing units and said main controller are communicatively arranged to form a physical artificial neural network.

11. The olfactory sensing device as recited in claim 10 wherein said openings formed on said bases of each of said plurality of olfactory processing units are axially aligned within said interior area of said housing.

12. The olfactory sensing device as recited in claim 11 wherein said main controller comprises a processor configured to combine sensor data collected from said plurality of chemical detection sensors to generate a chemical profile in the flow of air.

13. A method of detecting an odorant via an olfactory sensing device, the method comprising:

collecting a flow of air through an inlet of an olfactory sensing device, the olfactory sensing device comprising a housing and a plurality of olfactory processing units disposed within said interior area of said housing, each of the plurality of olfactory processing units comprising a centrally-disposed opening formed there through, each of said centrally-disposed openings collectively forming an inner channel through the plurality of olfactory processing units, maintaining the flow of air within an interior area of the housing for an amount of time, the air flowing over and around the plurality of olfactory processing units, drawing the flow of air through the inner channel formed via the centrally-disposed openings disposed within each of the plurality of processing units, and expelling the air through an exhaust port formed in the housing, wherein the inlet and the exhaust port are both disposed on a same side of the plurality of olfactory processing units, sensing, in parallel, at least one chemical compound in the flow of air via a plurality of chemical detection sensors disposed around the opening of each of the plurality of olfactory processing units, each of the plurality of olfactory sensing units further comprising at least one potentiostat and at least one processor communicative with corresponding ones of the plurality of chemical detection sensors, communicating sensed data from each of the plurality of olfactory processing units to a main controller, and fusing, at the main controller, the sensed data to generate an accurate chemical profile in the flow of air.

14. The method as recited in claim 13 further comprising defining the plurality of olfactory processing units and the main controller as being communicatively arranged with one another to form a physical artificial neural network.

15. The method as recited in claim 13 further comprising storing, for subsequent use, a charge generated while sensing at least one chemical compound in the flow of air via the plurality of chemical detection sensors.

16. The olfactory sensing device as recited in claim 1 wherein said at least one olfactory processing unit is electrically connected to at least one power storage device for storing a charge generated while sensing at least one chemical compound in the flow of air via said plurality of chemical detection sensors.

\* \* \* \* \*